(12) United States Patent
Sharma et al.

(10) Patent No.: US 9,268,691 B2
(45) Date of Patent: Feb. 23, 2016

(54) FAST MECHANISM FOR ACCESSING 2N±1 INTERLEAVED MEMORY SYSTEM

(75) Inventors: Saurabh Sharma, El Dorado Hills, CA (US); Altug Koker, El Dorado Hills, CA (US); Aditya Navale, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 85 days.

(21) Appl. No.: 13/993,680

(22) PCT Filed: Jun. 11, 2012

(86) PCT No.: PCT/US2012/041855
§ 371 (c)(1),
(2), (4) Date: Jun. 12, 2013

(87) PCT Pub. No.: WO2013/187862
PCT Pub. Date: Dec. 19, 2013

(65) Prior Publication Data
US 2014/0025908 A1      Jan. 23, 2014

(51) Int. Cl.
*G06F 13/00* (2006.01)
*G06F 13/28* (2006.01)
*G06F 9/26* (2006.01)
*G06F 9/34* (2006.01)
*G06F 12/06* (2006.01)

(52) U.S. Cl.
CPC ...... *G06F 12/0607* (2013.01); *G06F 2212/302* (2013.01)

(58) Field of Classification Search
CPC .................................................. G06F 12/0607
See application file for complete search history.

(56) References Cited

U.S. PATENT DOCUMENTS

| 6,519,673 | B1 | 2/2003 | Chudnovsky et al. |
| 6,701,467 | B1 | 3/2004 | Victor |
| 2003/0149849 | A1 | 8/2003 | Kim et al. |
| 2004/0093457 | A1* | 5/2004 | Heap ............................... 711/5 |

FOREIGN PATENT DOCUMENTS

| EP | 1020996 A1 | 7/2000 |
| EP | 2119099 B1 | 10/2011 |

OTHER PUBLICATIONS

Karp, Alan H. "Bank Conflicts in Cache Tags", Hewlett Packard, Nov. 1994.*
PCT International Search Report for PCT Counterpart Application No. PCT/US2012/041855, 6 pgs., (Aug. 27, 2013).
(Continued)

*Primary Examiner* — Eric S Cardwell
(74) *Attorney, Agent, or Firm* — Nicholson De Vos Webster & Elliott LLP

(57) ABSTRACT

A mechanism implemented by a controller enables efficient access to an interleaved memory system that includes M modules, M being $(2^n+1)$ or $(2^n-1)$, n being a positive integer number. Upon receiving an address N, the controller performs shift and add/subtract operations to obtain a quotient of N divided by M based on a binomial series expansion of N over M. The controller computes a remainder of N divided by M based on the quotient. The controller then accesses one of the modules in the memory based on the remainder.

24 Claims, 16 Drawing Sheets

Hardware implementation of a divider that uses $2^n-1$ as divisor

(56) References Cited

OTHER PUBLICATIONS

PCT Written Opinion of the International Searching Authority for PCT Counterpart Application No. PCT/US2012/041855, 4 pgs., (Aug. 27, 2013).
De Dinechin, Benoit Dupont, "A Ultra Fast Euclidean Division Algorithm for Prime Memory Systems," Proceedings of the 1991 ACM/IEEE Conference on Supercomputing, Aug. 1991, pp. 56-65.
Gao, Q. S., "The Chinese Remainder Theorem and the Prime Memory System," Proceeding of the 20th Annual International Symposium of Computer Architecture, May 1993, pp. 337-340.
Kharbutli, M, et al, "Using Prime Numbers for Cache Indexing to Eliminate Conflict Misses," In Intl Symposium of High Performance Computer Architecture, Feb. 2004, 12 pages.
Lawrie, D. H., et al, "The Prime Memory System for Array Access," IEEE Transactions on Computers, 31(5), May 1982, pp. 435-442.
Raghavan, Hayes, et al, "On Randomly Interleaved Memories," Proceedings of the 1990 ACM/IEEE Conference on Supercomputing, Oct. 1990, pp. 49-58.
Rau, B. R., "Pseudo-Randomly Interleaved Memory," In Proceedings of the 18th International Symposium on Computer Architecture (ISCA), May 1991, pp. 74-83.
Seznec, Andre, et al, "Odd Memory System May Be Quite Interesting," Proceedings of the 20th Annual International Symposium on Computer Architecture, May 1993, pp. 341-350.
Yang, Q, et al, "A Novel Cache Design for Vector Processing," In Proceedings of the International Symposium on Computer Architecture, May 1992, pp. 362-371.

* cited by examiner

| | MODULES | | | |
|---|---|---|---|---|
| OFFSET | 0 | 1 | 2 | 3 |
| 0 | 00 | 01 | 02 | 03 |
| 1 | 04 | 05 | 06 | 07 |
| 2 | 08 | 09 | 0A | 0B |
| 3 | 0C | 0D | 0E | 0F |
| 4 | 10 | 11 | 12 | 13 |
| 5 | 14 | 15 | 16 | 17 |
| 6 | 18 | 19 | 1A | 1B |
| 7 | 1C | 1D | 1E | 1F |
| 8 | 20 | 21 | 22 | 23 |
| 9 | 24 | 25 | 26 | 27 |
| 10 | 28 | 29 | 2A | 2B |
| 11 | 2C | 2D | 2E | 2F |
| 12 | 30 | 31 | 32 | 33 |
| 13 | 34 | 35 | 36 | 37 |
| 14 | 38 | 39 | 3A | 3B |
| 15 | 3C | 3D | 3E | 3F |

FIG. 1A
(PRIORT ART)

| | MODULES | | | | |
|---|---|---|---|---|---|
| OFFSET | 0 | 1 | 2 | 3 | 4 |
| 0 | 00 | 01 | 02 | 03 | x |
| 1 | 05 | 06 | 07 | x | 04 |
| 2 | 0A | 0B | x | 08 | 09 |
| 3 | 0F | x | 0C | 0D | 0E |
| 4 | x | 10 | 11 | 12 | 13 |
| 5 | 14 | 15 | 16 | 17 | x |
| 6 | 19 | 1A | 1B | x | 18 |
| 7 | 1E | 1F | x | 1C | 1D |
| 8 | 23 | x | 20 | 21 | 22 |
| 9 | x | 24 | 25 | 26 | 27 |
| 10 | 28 | 29 | 2A | 2B | x |
| 11 | 2D | 2E | 2F | x | 2C |
| 12 | 32 | 33 | x | 30 | 31 |
| 13 | 37 | x | 34 | 35 | 36 |
| 14 | x | 38 | 39 | 3A | 3B |
| 15 | 3C | 3D | 3E | 3F | x |

FIG. 1B
(PRIORT ART)

|  | MODULES | | | | |
| --- | --- | --- | --- | --- | --- |
|  | 0 | 1 | 2 | 3 | 4 |
| OFFSET 0 | 00 | 01 | 02 | 03 | 04 |
| 1 | 05 | 06 | 07 | 08 | 09 |
| 2 | 0A | 0B | 0C | 0D | 0E |
| 3 | 0F | 10 | 11 | 12 | 13 |
| 4 | 14 | 15 | 16 | 17 | 18 |
| 5 | 19 | 1A | 1B | 1C | 1D |
| 6 | 1E | 1F | 20 | 21 | 22 |
| 7 | 23 | 24 | 25 | 26 | 27 |
| 8 | 28 | 29 | 2A | 2B | 2C |
| 9 | 2D | 2E | 2F | 30 | 31 |
| 10 | 32 | 33 | 34 | 35 | 36 |
| 11 | 37 | 38 | 39 | 3A | 3B |
| 12 | 3C | 3D | 3E | 3F |  |
| 13 |  |  |  |  |  |
| 14 |  |  |  |  |  |
| 15 |  |  |  |  |  |

FIG. 1C

Hardware implementation of a divider that computes an approximate quotient when divisor is 7 (i.e., $2^3-1$)

Hardware implementation of a divider that uses $2^n-1$ as divisor

Hardware implementation of a divider that uses $2^n+1$ as divisor

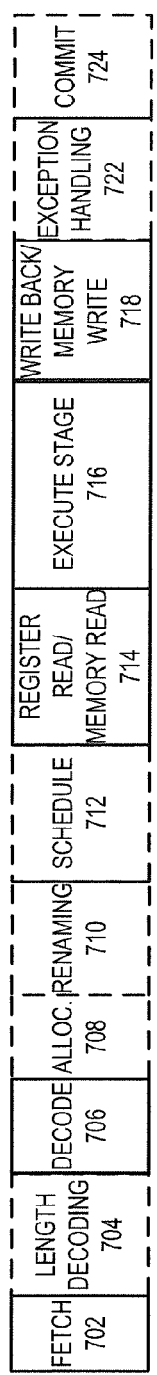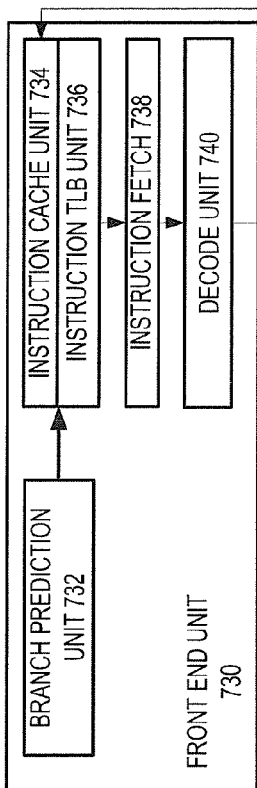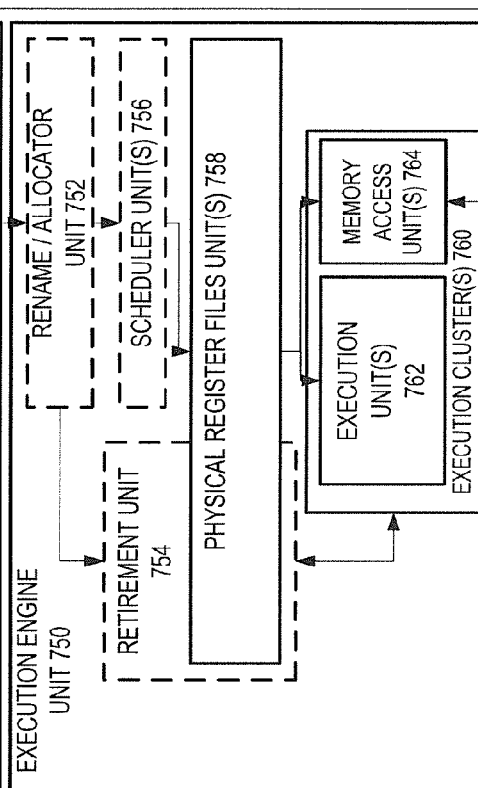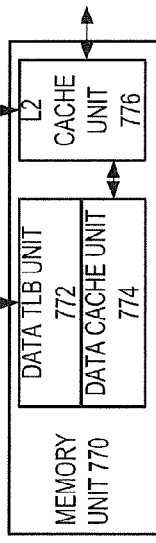
FIG. 7A
FIG. 7B

FAST MECHANISM FOR ACCESSING 2N±1 INTERLEAVED MEMORY SYSTEM

CROSS-REFERENCE TO RELATED APPLICATION

This patent application is a U.S. National Phase Application under 35 U.S.C. §371 of International Application No. PCT/US2012/041885 filed Jun. 11, 2012, entitled A FAST MECHANISM FOR ACCESSING $2^n \pm 1$ INTERLEAVED MEMORY SYSTEM.

TECHNICAL FIELD

The present disclosure pertains to the field of processing logic, microprocessors, and associated instruction set architecture that, when executed by the processor or other processing logic, perform logical, mathematical, or other functional operations.

BACKGROUND ART

Today's high performance processors generally include multithreaded parallel processing cores that perform well on a wide range of computation-intensive applications. For example, a graphics processing unit (GPU) includes parallel computing hardware for graphics applications. Theoretically, the GPU performance is a product of two factors: number of floating-point units (FPUs) and the inherent parallelism present in the application. Major advancement in the semiconductor process technology, such as the continued miniaturization of CMOS devices, has produced faster and smaller transistors, enabling massive number of FPUs in a single GPU. Further, this large number of FPUs has provided the software programmer with substrate to rapidly solve complex problems that have considerable parallelism. These trends have significantly increase the processor performance, enabling leaps in software functionality and making the processor a ubiquitous commodity.

Unfortunately, there are various factors that can contribute to less-than-optimal performance of parallel computing devices, such as GPUs or general purpose processors. One such factor is the design of the memory system that may fall short in providing the matching bandwidth (data throughput) required by the high computation needs of the processor. The conventional solution is to organize memory system as multiple memory modules (banks) that can be accessed in parallel; i.e., interleaved memory. If the memory access pattern is uniformly distributed among all the modules, then full bandwidth of the memory system can be achieved and the design problem can be translated by just increasing the number of memory modules to match the GPU requirements. On the other hand, if the access pattern is not uniformly distributed, there can be significant decrease in the performance due to contention.

Graphics and general purpose scientific applications typically include computations such as matrix operations on dense or sparse matrices, interpolation, convolution, Fast Fourier Transforms, table lookups, etc. These applications tend to generate interleaved streams of access patterns that either contains constant strides or a structured pattern of strides. Moreover, these applications can also generate unordered access patterns that seem random. Thus, there is a need for an interleaving memory system that avoids conflicts and is capable of providing high bandwidth across access patterns.

BRIEF DESCRIPTION OF THE DRAWINGS

Embodiments are illustrated by way of example and not limitation in the Figures of the accompanying drawings:

FIG. 1A is a diagram of an example of an interleaved memory system that stores an array of data elements.

FIG. 1B is a diagram of another example of an interleaved memory system that stores an array of data elements.

FIG. 1C is a diagram of an example of an interleaved memory system that stores an array of data elements according to an embodiment.

FIG. 7A is a block diagram of an in-order and out-of-order pipeline according to one embodiment.

FIG. 7B is a block diagram of an in-order and out-of-order core according to one embodiment.

DESCRIPTION OF THE EMBODIMENTS

Figure 2:
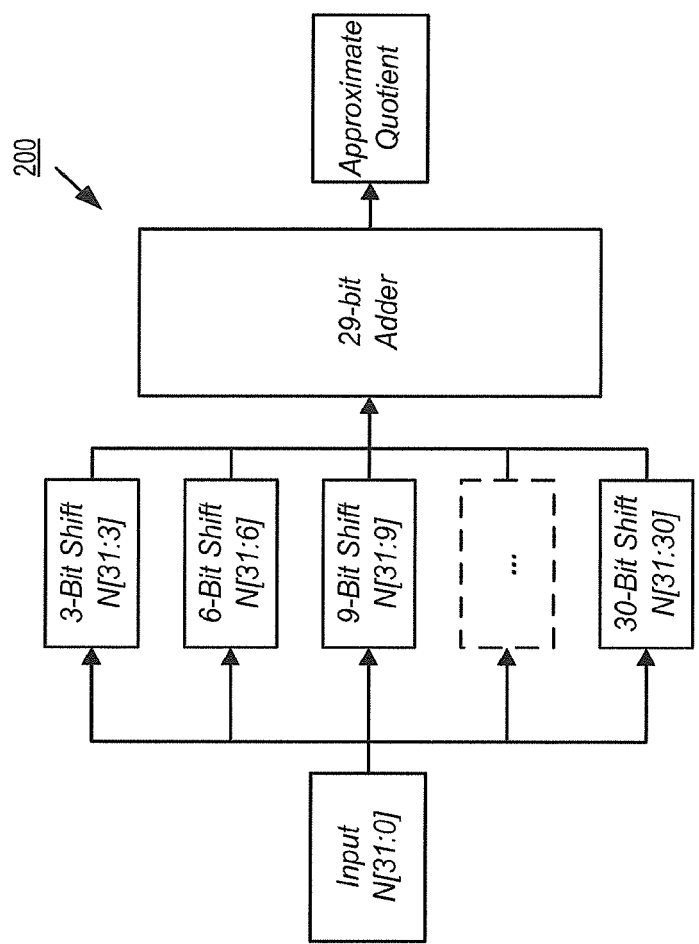
FIG. 2 is a block diagram of a divider that computes an approximate quotient according to an embodiment.

In the following description, numerous specific details are set forth. However, it is understood that embodiments of the invention may be practiced without these specific details. In other instances, well-known circuits, structures and techniques have not been shown in detail in order not to obscure the understanding of this description.

A mechanism for accessing a given location in an interleaved memory system is described. According to embodiments of the invention, the interleaved memory system includes $(2^n+1)$ or $(2^n-1)$ (referred to as $2^n \pm 1$) memory modules, where n is a positive integer. The mechanism described herein calculates, in a single operation cycle, the remainder as well as the quotient for the given address when divided by $2^n \pm 1$. The remainder provides an index for selecting one of the memory modules for data access, and the quotient provides the offset into the selected memory module.

In one embodiment, the interleaved memory system may be part of GPU architecture. In an alternative embodiment, the interleaved memory system may be the main memory on a general purpose computing platform. The mechanism can also be used to select an index in a set-associative cache where the number of sets is equal to $2^n \pm 1$. Moreover, the mechanism can be extended for any system that can generate multiple memory requests per cycle; e.g., vector processor, VLIW and superscalar out-of-order processor. Therefore, the term "memory" or "interleaved memory system" hereinafter refers to the main memory or the cache memory, which is located within or coupled to a general purpose processor or a special purpose processor (e.g., a GPU).

Embodiments of the invention increase the utilization and bandwidth of an interleaved memory system. Data elements can be uniformly distributed in memory and accessed with high speed. When implemented for a set-associative cache, the increase of set utilization means less conflict in cache storage and better hit rate. Moreover, embodiments of the invention can be implemented in hardware with low-cost shifters and adders, which can perform address computations with high speed.

Consider an interleaved memory system that has M memory modules. There are two broad class of techniques discussed in the literature that are used to select a module for a given access address. These two classes of techniques are known as the modulo schemes and the linear schemes. The modulo schemes select the module for a given address N by a MOD function—i.e., N % M. The linear schemes employ a one-to-one mappings function—usually XOR—that maps the address to some location in memory in a pseudo-random fashion. However, it has been shown previously that linear scheme behaves poorly and can result in worst performance for some regular access patterns.

With respect to the modulo schemes, in general, M is usually chosen as a power-of-2 number; i.e., $M=2^n$. Given that M is power-of-2, no division is necessary for calculating either the quotient or the remainder. The lower order n bits provide the remainder (which represents one of the modules) while the upper order bits provide the quotient (which represents the offset within the module). This implementation provides full bandwidth in case of sequential memory accesses as well as access pattern whose strides are relatively prime to M; e.g., access patterns with odd strides. However, the bandwidth of this implementation degrades significantly when the access pattern has either an even stride, or the stride is a multiple of M. The relationship between the number of referenced modules ($M_{ref}$), the number of modules (M) and the size of the stride (s) can be summarized mathematically as $$M_{ref} = \frac{M}{greatest-common-divisor(M, s)}$$

FIG. 1A illustrates an example in which a modulo scheme is used for accessing an interleaved memory system having power-of-2 modules. The memory is organized as an 8×8 array stored in 4 modules using row-major storage where the addresses are represented with hexadecimal numbers. Full bandwidth can be achieved by sequential row access (e.g., the first row 00-01-02-03 followed by the second row 04-05-06-07, etc.) as well as diagonal accesses (e.g., 00-05-0A-0F), because the stride between the addresses is relatively prime to 4. However, sequential column accesses (e.g., 00-04-08-0C) will produce strides that are multiple of 4, and the performance of the memory system will degrade into a non-interleaved memory.

FIG. 1B illustrates another example in which a modulo scheme is used for accessing an interleaved memory system having 5 modules (i.e., $2^2 \pm 1$). The memory is organized such that any 5 consecutive elements of row, column, diagonal, etc., all lie in different modules and thus can be accessed in parallel to provide the full bandwidth. The example of FIG. 1B shows that having a memory system with odd, prime, or pseudo-prime number of modules provides an opportunity for conflict-free accesses. However, previous implementations perform true division over $2^n \pm 1$, which is computationally expensive. Some other implementations for simplicity calculate the offset within a module via division over power-of-2. As shown in FIG. 1B, the memory system uses 5 modules but the offset is calculated via dividing the address with 4. This simplified calculation introduces "holes"—unused memory location—in the memory (e.g., the blocks marked "x" in FIG. 1B), which results in inefficient memory utilization. Other prior approaches have provided solutions for calculating a quotient when dividing a given address with $2^n \pm 1$. Unfortunately, these prior approaches have advocated the use of either an access table or some form of recursive-reduction logic, both of which are not computationally efficient.

FIG. 1C illustrates an example in which a modulo scheme is used for accessing an interleaved memory system having 5 modules (i.e., $2^2+1$) according to an embodiment of the invention. In this example, the 8×8 matrix is stored in row-major in 5 memory modules and the offset is calculated as the address divided by 5. As will be described in detail below, embodiments of the invention provide a computationally efficient scheme for calculating the quotient and the remainder of a given number divided by $2^n \pm 1$. In a scenario where this given number is an address in memory and the number of modules is $2^n \pm 1$, the remainder indicates one of the modules at which the address is located and the quotient indicates the offset within the module.

According to an embodiment of the invention, the quotient of any number when divided with $2^n \pm 1$ can be quickly calculated utilizing the number theory. Neither an access table nor recursive-reduction logic is used. Rather, the quotient is calculated using shift, add and subtract operations that can be computed in an ultra-fast manner. In one embodiment, the quotient is calculated by a binomial series expansion, and example of which is illustrated below:

$$(1+x)^n = 1 + \frac{nx}{1!} + \frac{n(n-1)x^2}{2!} + \frac{n(n-1)(n-2)x^3}{3!} + \ldots$$

Using the above equation, the series for $$\frac{N}{(2^n-1)} \text{ and } \frac{N}{(2^n+1)}$$

can be expanded as below:

Expansion of $\frac{N}{2^n-1}$ and $\frac{N}{2^n+1}$ $$\frac{N}{2^n-1} = \frac{N}{2^n}\left(1-\frac{1}{2^n}\right)^{-1} = \frac{N}{2^n}\left(1+\frac{1}{2^n}+\frac{1}{2^{2n}}+\frac{1}{2^{3n}}+\ldots\right) = \left(\frac{N}{2^n}+\frac{N}{2^{2n}}+\frac{N}{2^{3n}}+\frac{N}{2^{4n}}+\ldots\right) \quad \text{Equation 1}$$

$$\frac{N}{2^n+1} = \frac{N}{2^n}\left(1+\frac{1}{2^n}\right)^{-1} = \frac{N}{2^n}\left(1-\frac{1}{2^n}+\frac{1}{2^{2n}}-\frac{1}{2^{3n}}+\ldots\right) = \left(\frac{N}{2^n}-\frac{N}{2^{2n}}+\frac{N}{2^{3n}}-\frac{N}{2^{4n}}+\ldots\right)$$

As can be seen from Equation 1, the calculation for an approximate offset (quotient) within a memory module for any address N can be reduced to only shift-and-add (or shift and alternating add and subtract) operations—collectively referred to as shift-and-add/subtract operations—which can be computed in less than a cycle. Using the above equation, an approximate quotient when any natural number N (of length l) is divided with $2^n \pm 1$ can be formulated as follows:

Approximate Quotient of any Natural number $N$
when divided with $2^n \pm 1$ $$Q_{2^n-1(approx)} = N \sum_{i=1}^{m=\frac{l}{n}} \frac{1}{2^{in}}$$

$$Q_{2^n+1(approx)} = N \sum_{i=1}^{m=\frac{l}{n}} (-1)^{i+1} \frac{1}{2^{in}}$$

Equation 2

Equation 2 encapsulates the method for calculating an approximate quotient and is straight forward to implement in hardware. In one embodiment, the hardware includes shifters and adders that can be incorporated cheaply in the system. For example, a 32-bit number when divided with $2^3-1$ (i.e., 7) will need m=32/3=11 shifters and one addition operation with 29-bit full adder. FIG. 2 illustrates an example of an apparatus 200 including eleven shifters and one adder used for calculating an approximate quotient when a natural number N is divided by 7. Further, Table 1 exemplifies the calculation of the approximate quotient via Equation 2 for different $2^n \pm 1$ divisors. The first column of the table shows the dividend while the second column shows the divisor. The third column of the table calculates the approximate quotient using Equation 2 while the fourth column shows the actual quotient. As can be seen, the simple shift-add circuitry often computes the exact quotient but sometime produces wrong answers (shown in the rows with a circled x).

TABLE 1

Approximate quotient calculation examples
when a number is divided with $2^n \pm 1$

| Natural Number | Divisor | Approximate Quotient | Quotient |
|---|---|---|---|
| 512 | 3 ($2^2-1$) | 512/4 + 512/16 + 512/64) + 512/256 = 128 + 32 + 8 + 2 = 170 | 170 |
| 29 | 3 ($2^2-1$) | 29/4 + 29/16 = 8 ⊗ | 9 |
| 1681 | 5 ($2^2+1$) | 1681/4 − 1681/16 + 1681/64 − 1681/256 + 1681/1012 = 420 − 105 + 26 − 6 + 1 = 336 | 336 |
| 28 | 5 ($2^2+1$) | 28/4 − 28/16 = 7 − 1 = 6 ⊗ | 5 |
| 4099 | 7 ($2^3-1$) | 4099/8 + 4099/64 + 4099/512 + 4099/4096 = 512 + 64 + 8 + 1 = 585 | 585 |
| 63 | 7 ($2^3-1$) | 63/8 = 7 ⊗ | 9 |
| 8194 | 9 ($2^3+1$) | 8194/8 − 8194/64 + 8194/512 − 8194/4096 = 1024 − 128 − 2 = 910 | 910 |
| 33 | 9 ($2^3+1$) | 33/8 = 4 ⊗ | 3 |

Before continuing the description, some basic questions warrant answers: What is the simplest way for adjusting the inexact quotient to be exact? How can one incorporate equations presented above to calculate a complex operation (e.g., division) using simple and ultra-fast hardware? These questions are answered in the following sections.

Adjusting the Approximate Quotient

A mechanism is provided for adjusting an inexact quotient to be exact. Before describing this mechanism, it is useful to first discuss the calculation of an approximate remainder—or modulo—when dividing any natural number N with $2^n \pm 1$. Using binary arithmetic, any natural number N (e.g., an address of a memory location) can be expanded in a polynomial form of radix-n (base $2^n$ digits) as shown in Equation 3. In this equation constants such as: $a_0, a_1, a_2$, etc., are nibbles of size n-bits each. Further, the approximate remainder of any number with divisor $2^n \pm 1$ is illustrated below using Equation 4.

Polynomial expansion of natural number
$N$ in exponential form of radix-$n$ $$N = a_0 + a_1 2^n + a_2 2^{2n} + a_3 2^{3n} + \ldots$$

Equation 3

Approximate Remainder of any Natural
number $N$ when divided with $2^n \pm 1$ $$\begin{aligned}R_{2^n-1(approx)} &= N \,\%\, (2^n - 1) \\ &= (a_0 + a_1 2^n + a_2 2^{2n} + a_3 2^{3n} + \ldots) \,\%\, (2^n - 1) \\ &= (a_0 + a_1(2^n - 1 + 1) + a_2(2^n - 1 + 1)^2 + \\ &\quad a_3(2^n - 1 + 1)^3 + \ldots) \,\%\, (2^n - 1) \\ &= ([a_0 + a_1 + a_2 + a_3 + \ldots] + \\ &\quad [\text{some-multiple of } (2^n - 1)]) \,\%\, (2^n - 1) \\ &= a_0 + a_1 + a_2 + a_3 + \ldots \end{aligned}$$

$$\begin{aligned}R_{2^n+1(approx)} &= N \,\%\, (2^n + 1) \\ &= (a_0 + a_1 2^n + a_2 2^{2n} + a_3 2^{3n} + \ldots) \,\%\, (2^n + 1) \\ &= (a_0 + a_1(2^n + 1 - 1) + a_2(2^n + 1 - 1)^2 + \\ &\quad a_3(2^n + 1 - 1)^3 + \ldots) \,\%\, (2^n + 1) \\ &= ([a_0 - a_1 + a_2 - a_3 + \ldots] + \\ &\quad [\text{some-multiple of } (2^n + 1)]) \,\%\, (2^n + 1) \\ &= a_0 - a_1 + a_2 - a_3 + \ldots \end{aligned}$$

Equation 4

As can be seen from Equation 4, the approximate remainder can be easily calculated by separating any given number into m different nibbles of size n-bits each. Finally, add/subtract operations are performed on these nibbles to calculate approximate remainder. Table 2 shows the approximate remainder calculated using Equation 4 for the same natural numbers and divisors as Table 1. The third column in the table shows the approximate remainder and its calculation while the fourth column represents the approximate remainder in the Euclidean-division form. Finally, the actual remainder is shown in the fifth column. An important observation is that the numbers whose computed quotients are not exact also have inexact remainders. Moreover, the difference between the approximate quotient and the exact quotient is hidden in the approximate remainder—as shown in the fourth column of Table 2. For example, when 29 is divided by 3 using Equation 2 the approximate quotient comes out to be 8. If we add 1 to 8 as shown in the Euclidean form then we obtain the correct quotient. Similarly, when 28 is divided by 5 the computed quotient is 6. If we subtract 1 from 6 then we obtain the exact quotient. This property can be used to adjust the inexact quotient to an exact one. This property is formulated in Equation 5.

TABLE 2

Approximate remainder calculation examples when a number is divided with $2^n \pm 1$

| Natural Number | Divisor | Approximate Remainder | Euclidean Form | Remainder |
|---|---|---|---|---|
| 512 | 3 ($2^2 - 1$) | b(1000000000) = b(00) + b(00) + b(00) + b(00) + b(00) + b(10) = b(10) = 2 | (0 * 3) + 2 | 2 |
| 29 | 3 ($2^2 - 1$) | b(11101) = b(01) + b(11) + b(01) = b(101) = 5 | (1 * 3) + 2 | 2 |
| 1681 | 5 ($2^2 + 1$) | b(11010010001) = b(01) − b(00) + b(01) − b(10) + b(10) − b(01) = b(01) = 1 | (0 * 5) + 1 | 1 |
| 28 | 5 ($2^2 + 1$) | b(11100) = b(00) − b(11) + b(01) = −b(10) = −2 | (−1 * 5) + 3 | 3 |
| 4099 | 7 ($2^3 - 1$) | b(1000000000011) = b(011) + b(000) + b(000) + b(000) = b(001) + b(100) = 4 | (0 * 7) + 4 | 4 |
| 63 | 7 ($2^3 - 1$) | b(111111) = b(111) + b(111) = b(1110) = 14 | (2 * 7) + 0 | 0 |
| 8194 | 9 ($2^3 + 1$) | b(10000000000010) = b(010) − b(000) + b(000) − b(000) + b(010) = b(100) = 4 | (0 * 9) + 4 | 4 |
| 33 | 9 ($2^3 + 1$) | b(100001) = b(001) − b(100) = −b(11) = −3 | (−1 * 9) + 6 | 6 |

$$Q_{2^n \pm 1} = Q_{2^n \pm 1(approx)} + \delta_{2^n \pm 1}$$

$$R_{2^n \pm 1} = R_{2^n \pm 1(approx)} - \delta_{2^n \pm 1}(2^n \pm 1)$$

$$N = Q_{2^n \pm 1}(2^n \pm 1) + R_{2^n \pm 1} = (Q_{2^n \pm 1(approx)} + \delta_{2^n \pm 1})(2^n \pm 1) + R_{2^n \pm 1}$$

Equation 5: Equations that Represent the Difference Between Exact and Inexact Divisions with $2^n - 1$ Divisor The first part of Equation 5 indicates that the difference between the exact and approximate quotients is $\delta_{2^n \pm 1}$, while the second part indicates that the accurate result is obtained when the difference is removed from the approximate remainder. The third part of Equation 5 shows an important property, which is a natural number N represented in Euclidean division form. One can deduce that rather than estimating the approximate quotient for any natural number N, Equation 2 can be applied to $N2^k$ where k stand for the number of bits needed to represent: "$\delta_{2^n \pm 1}(2^n \pm 1)$". Subsequently, the quotient can be deduced by removing the k least-significant-bits from the answer. This observation is formulated in Equation 6. Calculation of a quotient via Equation 6 is close to exact. The property can be proven empirically.

Close-to-exact Quotient of any Natural number $N$ when divided with $2^n \pm 1$ $$Q'_{2^n-1(approx)} = \frac{N2^k}{2^k}\left(\frac{1}{2^n} + \frac{1}{2^{2n}} + \frac{1}{2^{3n}} + \ldots\right) = \frac{1}{2^k}\left[N2^k \sum_{i=1}^{m=\frac{l+k}{n}} \frac{1}{2^{in}}\right]$$

$$Q'_{2^n+1(approx)} = \frac{N2^k}{2^k}\left(\frac{1}{2^n} - \frac{1}{2^{2n}} + \frac{1}{2^{3n}} - \ldots\right) = \frac{1}{2^k}\left[N2^k \sum_{i=1}^{m=\frac{l+k}{n}} (-1)^{i+1}\frac{1}{2^{in}}\right]$$

Equation 6

TABLE 3

The range of values of approximate remainder and $\delta_{2^n \pm 1}(2^n \pm 1)$

| Divisor | Range of approximate remainder for a 32-bit number | Range of $\delta(2^n \pm 1)$ for a 32-bit number | Number of bits to represent $\delta(2^n \pm 1)$ |
|---|---|---|---|
| 3 ($2^2 - 1$) | $0 \leq R_{(approx)} \leq 48$ | $0 \leq \delta(2^2 - 1) \leq 48$ | 6 |
| 5 ($2^2 + 1$) | $-24 \leq R_{(approx)} \leq 24$ | $-25 \leq \delta(2^2 + 1) \leq 20$ | 5 |
| 7 ($2^3 - 1$) | $0 \leq R_{(approx)} \leq 73$ | $0 \leq \delta(2^3 - 1) \leq 70$ | 7 |
| 9 ($2^3 + 1$) | $-35 \leq R_{(approx)} \leq 38$ | $-36 \leq \delta(2^3 + 1) \leq 36$ | 6 |
| 15 ($2^4 - 1$) | $0 \leq R_{(approx)} \leq 120$ | $0 \leq \delta(2^4 - 1) \leq 120$ | 7 |
| 17 ($2^4 + 1$) | $-60 \leq R_{(approx)} \leq 60$ | $-68 \leq \delta(2^4 + 1) \leq 51$ | 7 |
| 31 ($2^5 - 1$) | $0 \leq R_{(approx)} \leq 189$ | $0 \leq \delta(2^5 - 1) \leq 186$ | 8 |
| 33 ($2^5 + 1$) | $-93 \leq R_{(approx)} \leq 96$ | $-99 \leq \delta(2^5 + 1) \leq 66$ | 7 |
| 63 ($2^6 - 1$) | $0 \leq R_{(approx)} \leq 323$ | $0 \leq \delta(2^6 - 1) \leq 315$ | 9 |
| 65 ($2^6 + 1$) | $-129 \leq R_{(approx)} \leq 189$ | $-130 \leq \delta(2^6 + 1) \leq 130$ | 8 |

It is not difficult to estimate the number of bits needed to represent "$\delta_{2^n \pm 1}(2^n \pm 1)$" for implementation of constant integer divisions. Table 3 shows the range of values for "$\delta_{2^n \pm 1}(2^n \pm 1)$" with different divisors. The first column shows the divisors while the second column shows the range of approximate remainder. Similarly, the third column shows the range of "$\delta_{2^n \pm 1}(2^n \pm 1)$" while the fourth column shows the number of bits for "$\delta_{2^n \pm 1}(2^n \pm 1)$". For example, the largest approximate remainder when divided by 3 can be generated for 0xFFFFFFFF (i.e., 48). Similarly, the largest approximate remainder when divided by 5 can be generated for 0x33333333 (i.e., 24) while the smallest approximate remainder when divided by 5 can be generated for 0xCCCCCCCC (i.e., −24). Using the information from Table 3 and applying it to Equation 6, one can calculate the quotient of the running example. Table 4 exemplifies the calculation of the adjusted quotient via Equation 6 for the running example. It is evident that the computed quotient is correct for almost all of the entries except for one where the dividend is a multiple of the divisor (shown in the row marked with a circled x). Table 5 shows more scenarios when the dividend is a multiple of the divisor and the adjusted quotients for these numbers are incorrect (shown in the rows marked with a circled x). As difference between the computed and actual quotient is always one, this information can be used to tune the proposed mechanism.

TABLE 4

Adjusted quotient calculation examples when a number is divided with $2^n \pm 1$

| Natural Number | Divisor | Approximate Quotient | Quotient |
|---|---|---|---|
| 512 | 3 ($2^2 - 1$) | 1/64 [ 32768/4 + 32768/16 + 32768/64 + 32768/256 + 32768/1024 + 32768/4096 + 32768/16384 ] = 1/64 [ 8192 + 2048 + 512 + 128 + 32 + 8 + 2 ] = 10992/64 = 170 | 170 |
| 29 | 3 ($2^2 - 1$) | 1/64 [1856/4 + 1856/16 + 1856/64 + 1856/256 + 1856/1024 ] = 1/64 [ 464 + 116 + 29 + 7 + 1] = 617/64 = 9 | 9 |
| 1681 | 5 ($2^2 + 1$) | 1/32 [ 53792/4 − 53792/16 + 53792/64 − 53792/256 + 53792/1024 − 53792/4096 + 53792/16384 ] = 1/32 [ 13448 − 3362 + 840 − 210 + 52 − 13 + 3] = 10758/32 = 336 | 336 |
| 28 | 5 ($2^2 + 1$) | 1/32 [ 896/4 − 896/16 + 896/64 − 896/256] = 1/32 [ 224 − 56 + 14 − 3] = 179/32 = 5 | 5 |
| 4099 | 7 ($2^3 - 1$) | 1/128 [ 524672/8 + 524672/64 + 524672/512 + 524672/4096 + 524672/32768 + 524762/262144] = 1/128 [ 65584 + 8198 + 1024 + 102 + 16 + 2] = 74926/128 = 585 | 585 |
| 63 | 7 ($2^3 - 1$) | ⊗ 1/128 [ 8064/8 + 8064/64 + 8064/512 + 8064/4096] = 1/128 [ 1008 + 126 + 15 + 1] = 1150/128 = 8 | 9 |
| 8194 | 9 ($2^3 + 1$) | 1/64 [ 524416/8 − 524416/64 + 524416/512 − 524416/4096 + 524416/32768 − 524416/262144] = 1/64 [ 65552 − 8194 + 1024 − 128 + 16 − 2] = 58268/64 = 910 | 910 |
| 33 | 9 ($2^3 + 1$) | 1/64 + 2112/8 − 2112/64 + 2112/512 ] = 1/64 [ 264 − 33 + 4] = 233/64 =3 | 3 |

TABLE 5

Adjusted quotient calculation examples when the dividend is multiple of divisor

| Natural Number | Divisor | Approximate Quotient | Quotient | Remainder |
|---|---|---|---|---|
| 273 | 3 ($2^2 - 1$) | 1/64 [ 17472/4 + 17472/16 + 17472/64 + 17472/256⊗ + 17472/1024 + 17472/4096 + 17472/16384 ]=1/64 [ 4368 + 1092 + 273 + 68 + 17 + 4 + 1] = 5823/64 = 90 | 91 | 0 |
| 504 | 3 ($2^2 - 1$) | 1/64 [ 32256/4 + 32256/16 + 32256/64 + 32256/256 + 32256/1024 + 32256/4096 + 32256/16384 ] ⊗ =1/64 [ 8064 + 2016 + 504 + 126 + 31 + 7 + 1] = 10749/64 = 167 | 168 | 0 |
| 305 | 5 ($2^2 + 1$) | 1/32 [ 9760/4 − 9760/16 + 9760/64 − 9760/256 + 9760/1024 − 9760/4096] ⊗ = 1/32 [ 2440 − 610 + 152 − 38 + 9 − 2] = 1951/32 = 60 | 61 | 0 |
| 665 | 5 ($2^2 + 1$) | 1/32 [ 21280/4 − 21280/16 + 21280/64 − 21280/256 + 21280/1024 − 21280/4096 + 21280/16384] ⊗ = 1/32 [ 5320 − 1330 + 332 − 83 + 20 − 5 + 1] = 4255/32 = 132 | 133 | 0 |
| 7238 | 7 ($2^3 - 1$) | 1/128 [ 926464/8 + 926464/64 + 926464/512 + 926464/4096 + 926464/32768 + 926464/262144] ⊗ = 1/128 [ 115808 + 14476 + 1809 + 226 + 28 + 3] = 132350/128 = 1033 | 1034 | 0 |
| 7651 | 7 ($2^3 - 1$) | 1/128 [ 979328/8 + 979328/64 + 979328/512 + 979328/4096 + 979328/32768 + 979328/262144] ⊗ = 1/128 [ 122416 + 15302 + 1912 + 239 + 29 + 3] = 139901/128 = 1092 | 1093 | 0 |
| 711 | 9 ($2^3 + 1$) | 1/64 [ 45504/8 − 45504/64 + 45504/512 − 4550 + 4096 + 45504/32768] = 1/64 ⊗ [ 5688 − 711 + 88 − 11 + 1] = 5055/64 = 78 | 79 | 0 |
| 1413 | 9 ($2^3 + 1$) | 1/64 [ 90432/8 − 90432/64 + 90432/512 − 090432/4096 + 90432/32768] ⊗ = 1/64 [ 11304 − 1413 + 176 − 22 + 2] = 10047/64 = 156 | 157 | 0 |

Exact quotient of any natural
number N when divided with $2^n \pm 1$

Equation 7

$$Q_{2^n-1} = \begin{cases} \frac{1}{2^k}\left[N2^k \sum_{i=1}^{m=(l+k)/n} \frac{1}{2^{in}}\right] = Q'_{2^n-1(approx)} \\ \frac{1}{2^k}\left[N2^k \sum_{i=1}^{m=(l+k)/n} \frac{1}{2^{in}}\right] + 1 = Q'_{2^n-1(approx)} + 1 \end{cases}$$

$$Q_{2^n+1} = \begin{cases} \frac{1}{2^k}\left[N2^k \sum_{i=1}^{m=\frac{l+k}{n}} (-1)^{i+1} \frac{1}{2^{in}}\right] = Q'_{2^n+1(approx)} \\ \frac{1}{2^k}\left[N2^k \sum_{i=1}^{m=\frac{l+k}{n}} (-1)^{i+1} \frac{1}{2^{in}}\right] + 1 = Q'_{2^n+1(approx)} + 1 \end{cases}$$

Finally, the initial calculations described in Equation 2 are refined by Equation 6. Empirically gathered information indicates that Equation 6 produces exact quotients for most of the cases except when the dividend is a multiple of the divisor. Moreover, the difference between the computed quotient and the real answer for the incorrect scenario is always one. The above statements can be written mathematically as shown in Equation 7. The only dilemma is to select either "$Q'_{2^n \pm 1(approx)}$" or "$Q'_{2^n \pm 1(approx)}+1$" as the correct answer when any natural number N is divided with $2^n \pm 1$. As one of the expressions will produce the correct answer, the remainder R can be calculated using both expressions; whichever expression produces the remainder that follows the identity: "$0 \leq R < 2^n \pm 1$" is the correct answer.

Similarly, the remainders can also be calculated in a fast and inexpensive way, which is elaborated below. From the definition of Euclidean division, any natural number N can be represented in the following form:

$N = Q_{2^n \pm 1}(2^n \pm 1) + R$ $R_{2^n-1} = N - Q_{2^n-1} 2^n + Q_{2^n-1}$ $R_{2^n+1} = N - Q_{2^n+1} 2^n - Q_{2^n+1}$

Equation 8: Calculation of Remainder when the Quotient is Available

Equation 8 shows that the remainders can be calculated by a series of shift and add/subtract operations when the corresponding exact quotient is available.

Hardware Implementation

Figure 3A:
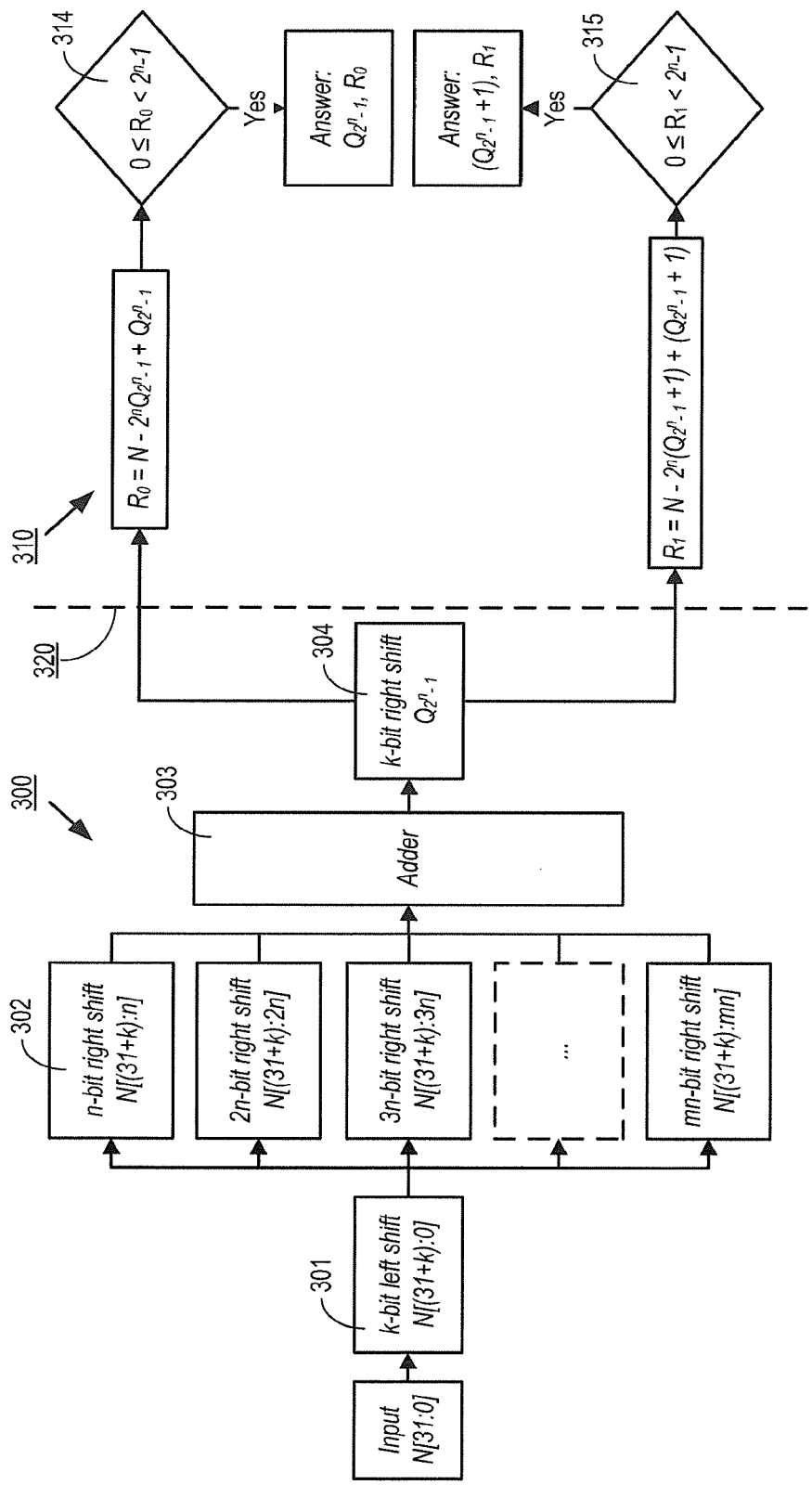
FIG. 3A is a block diagram of a divider that uses $2^n-1$ as a divisor according to an embodiment.
Figure 3B:
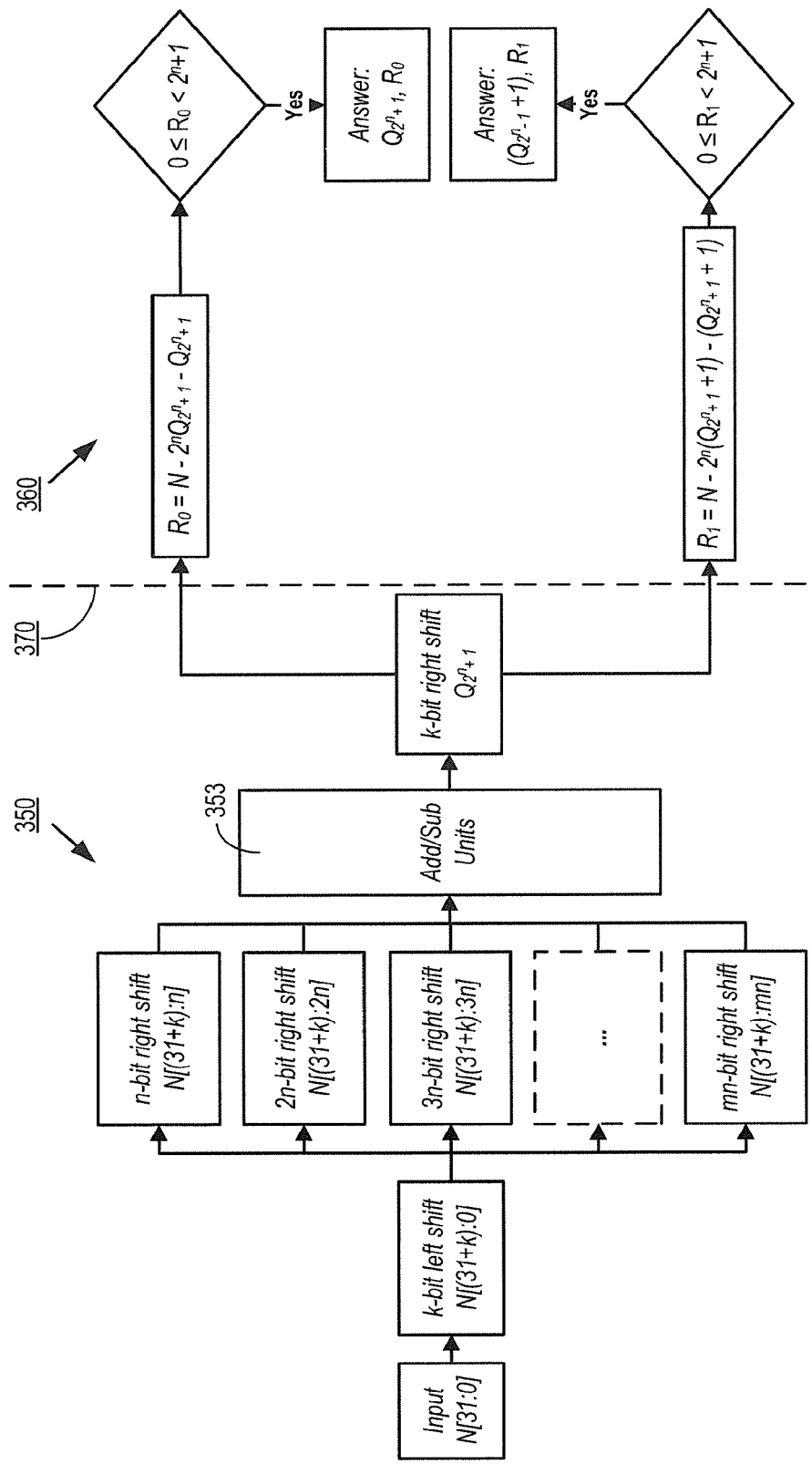
FIG. 3B is a block diagram of a divider that uses $2^n+1$ as a divisor according to an embodiment.

The previous section describes the mathematical background of the proposed fast division and lays the foundation for an ultra-fast divider when the divisor is of the form $2^n \pm 1$. The motivation for such a divider is to design an oddly-interleaved memory subs-system for conflict free access. This section describes the hardware implementation of the divider. FIGS. 3A and 3B show block diagrams of a constant divider when the divisor is of the form $2^n-1$ and $2^n+1$, respectively. The block diagrams show embodiments of hardware implementation for Equation 7 and Equation 8 that were developed in the previous section. The left side of the center dotted line 320 shows quotient calculation hardware 300 (including an adder 303 and shifters 301, 302 and 304) for calculating the quotient. As discussed previously, the natural number N is shifted left by k bits using the shifter 301 to increase the exactness of the computed quotient, and then the output of the adder 303 is shifted right by k bits using the shifter 304. The value of k has been discussed in the last section in Table 3 and depends upon the divisor as well as the length (l) of the dividend. In one embodiment, k is a pre-computed and programmable value. For example, quotient calculation hardware 300 can include a k-value table that stores a number of pre-computed k values for different combinations of n (divisors of the forms $2^n-1$ and $2^n+1$) and dividend lengths (l) (the bit length of a memory address). It has been observed that the shifters 301 and 304 can shift more than k bits in respective directions without changing the final result, as long as the two shifters shift the same number of bits.

In FIG. 3A, the right side of the center dotted line 320 shows remainder calculation logic 310 for calculating the remainder. The logic 310 can be implemented in hardware using one or more adders/subtractors, shifters and comparators. After calculating the quotient ($Q_{2^n \pm 1}$), the remainders $R_0$ and $R_1$ are estimated for both: "$Q_{2^n \pm 1}$" and "$Q_{2^n \pm 1}+1$", respectively, and whichever remainder follows the identity: "$0 \leq R < 2^n \pm 1$" (where R is $R_0$ or $R_1$, shown as elements 314 and 315 in FIG. 3A) is selected as the correct answer—referred to as the final remainder. Similarly, FIG. 3B shows a hardware portion 350 to the right side of the center dotted line 370 for calculating a quotient, and a logic portion 360 to the left side of the center dotted line 370 for calculating the remainder. The hardware portion 350 includes shifters and an alternating add/subtract circuitry 353. The logic portion 360 can be implemented in hardware using one or more adders/subtractors, shifters and comparators. The only difference between the two block diagrams in FIGS. 3A and 3B is that the former uses a full adder 303 while the latter uses alternating add/subtract circuitry 353. In some embodiments, the subtract circuitry can be implemented as an adder by negating the second operand.

Embodiments of the invention can be used for accessing graphics memory that stores vertex transformation data in a GPU having $2^n \pm 1$ memory modules (also referred to as memory channels or compute/memory slices in the context of a GPU). Moreover, embodiments of the invention can also be used for calculating the hash into a L2/L3 set-associative cache that has $2^n \pm 1$ number of sets. Having $2^n \pm 1$ sets for a cache in the lower-level hierarchy can avoid the worst case conflict miss scenario. For a set-associative cache having $2^n \pm 1$ sets, the remainder can be used to identify the module (i.e., the set) for accessing a data element with a given address. The quotient is not used for cache access, because the data element can be mapped to any slot within the identified set. Further, embodiments can also be applied to any other caches, including data or instruction caches, or general purpose memory (e.g., main memory).

Figure 4A:
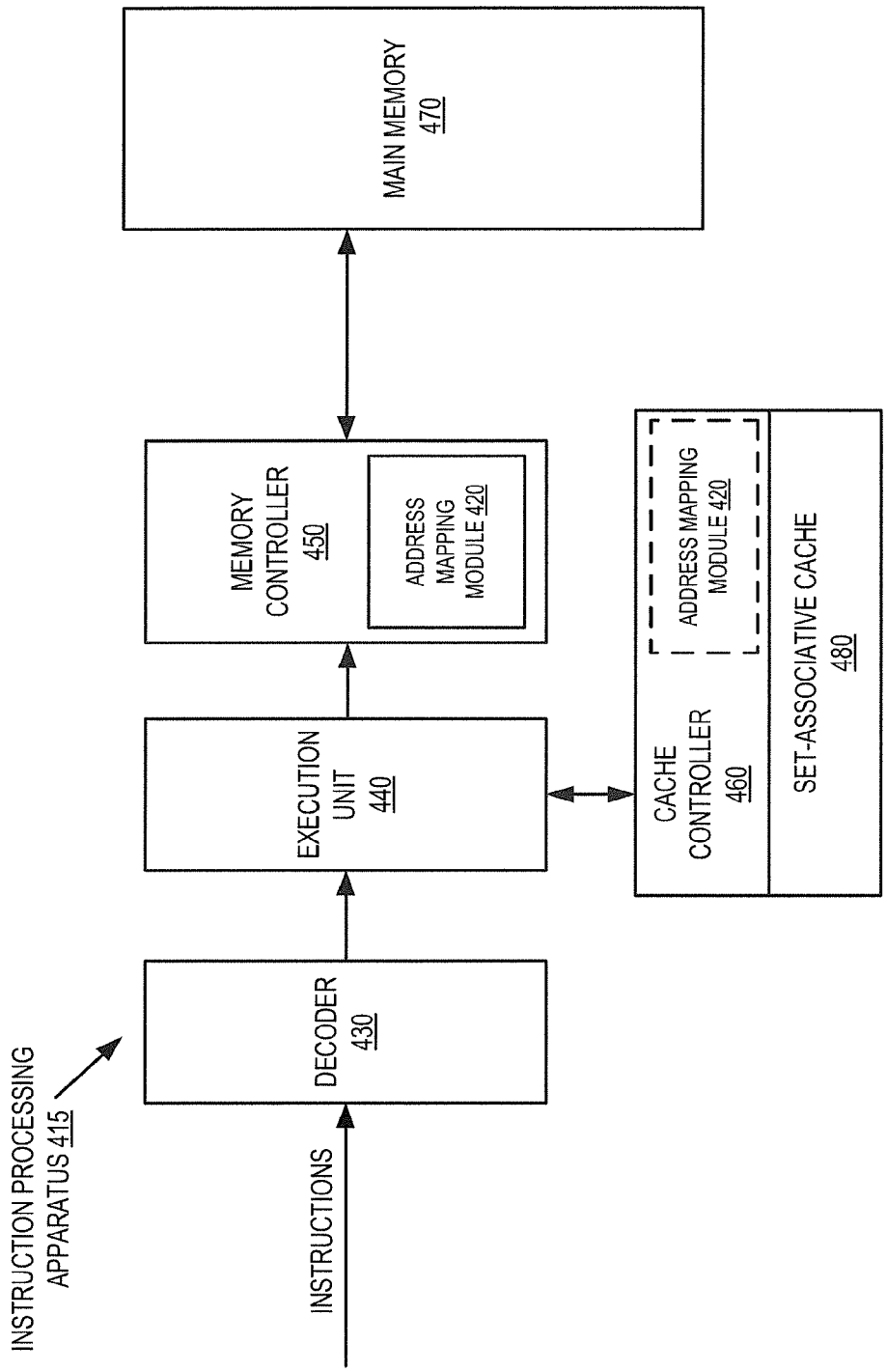
FIG. 4A is a block diagram of an instruction processing apparatus according to one embodiment.

FIG. 4A is a block diagram of an embodiment of an instruction processing apparatus 415 having an execution unit 440 operable to execute instructions. In some embodiments, the instruction processing apparatus 415 may be a processor (e.g., a general purpose processor or a special purpose processor such as a GPU), a processing core of a multi-core processor, or a processing element in an electronic system. The instruction processing apparatus 415 is shown to include a main memory 470. In some embodiments, the main memory 470 may be external to the processor (e.g., on a separate die) but coupled to the processor, or internal to the processor (e.g., on the same die). The main memory 470 includes $2^n \pm 1$ modules that form an interleaved memory system.

A decoder 430 receives incoming instructions in the form of higher-level machine instructions or macroinstructions, and decodes them to generate lower-level micro-operations, micro-code entry points, microinstructions, or other lower-level instructions or control signals, which reflect and/or are derived from the original higher-level instruction. The lower-level instructions or control signals may implement the operation of the higher-level instruction through lower-level (e.g., circuit-level or hardware-level) operations. The decoder 430 may be implemented using various different mechanisms. Examples of suitable mechanisms include, but are not limited to, microcode random access memories (ROMs), look-up tables, hardware implementations, programmable logic arrays (PLAs), other mechanisms used to implement decoders known in the art, etc.

The execution unit 440 is coupled to the decoder 430. The execution unit 440 may receive from the decoder 430 one or more micro-operations, micro-code entry points, microinstructions, other instructions, or other control signals, which reflect, or are derived from the received instructions. The execution unit 440 also receives input from and generates output to registers or locations in the main memory 470.

To avoid obscuring the description, a relatively simple instruction processing apparatus 415 has been shown and described. It is to be appreciated that other embodiments may have more than one execution unit. For example, the apparatus 415 may include multiple different types of execution units, such as, for example, arithmetic units, arithmetic logic units (ALUs), integer units, floating point units, etc. Still other embodiments of instruction processing apparatus or processors may have multiple cores, logical processors, or execution engines. A number of embodiments of the instruction processing apparatus 415 will be provided later with respect to FIGS. 7-13.

According to one embodiment, the instruction processing apparatus 415 includes a memory controller 450 for accessing the main memory 470. The memory controller 450 includes a address mapping module 420 for performing address calculations. In one embodiment, the address mapping module 420 includes one or more shifters and one or more adders (or shifters and an add/subtract unit) for performing shift-and-add/subtract operations. In one embodiment, the address mapping module 420 may include one or more ALUs and/or other logic, such as comparators, for perform the calculations of quotients and remainders. According to the calculation described above, the address mapping module 420 receives a given address N as input, and generates a module index (which identifies one of the memory modules) and an offset (which points to one memory location within the identified memory module). In one embodiment, the address mapping module 420 performs a series of shift-and-add/subtract operations to compute the expansion of binomial series for address N over $2^n \pm 1$ to thereby obtain a quotient (offset). The address mapping module 420 then uses the quotient to calculate the remainder (module index) according to Equation 8.

Alternatively or additionally, the address calculation described above can be performed for cache access. In one embodiment, the execution unit 440 is coupled to a set-associated cache 480 via a cache controller 460. The cache controller 460 may also include the address mapping module 420, which calculate the remainder (set index) for a given address N. The set index points to one of the sets in the set-associated cache 480. Typically, each set contains a number of slots, any of which can store a data element with address N. According to the set index, the cache controller 460 can store the data element into, or retrieve the data element from, one of the slots in the identified set.

Figure 4B:
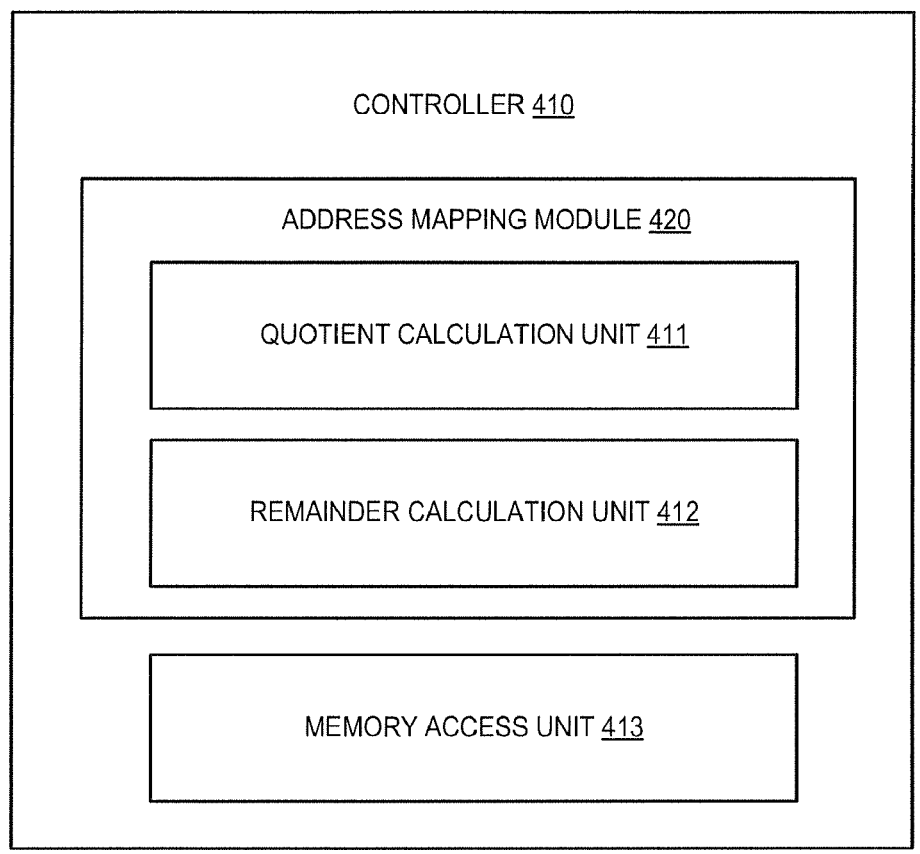
FIG. 4B is a block diagram of a controller that controls the access to an interleaved memory system according to one embodiment.

FIG. 4B is a block diagram of a controller 410 according to one embodiment of the invention. The controller 410 may be the memory controller 450 or the cache controller 460 of FIG. 4A. In one embodiment, the controller 410 includes the address mapping module 420 and a memory access logic 413. The address mapping module 420 includes a quotient calculation unit 411, which performs a series of shift-and-add/subtract operations to obtain the quotient of an address N divided by the number of modules M in the memory, where $M = 2^n \pm 1$ and n is an integer number. The address mapping module 420 also includes a remainder calculation unit 412, which performs shift and add/subtract operations as well as one or more compare operations to obtain the remainder of N divided by M. Based on the results of the calculation, the memory access unit 413 then accesses one of the modules in the memory (e.g., a main memory or a cache memory).

Figure 5:
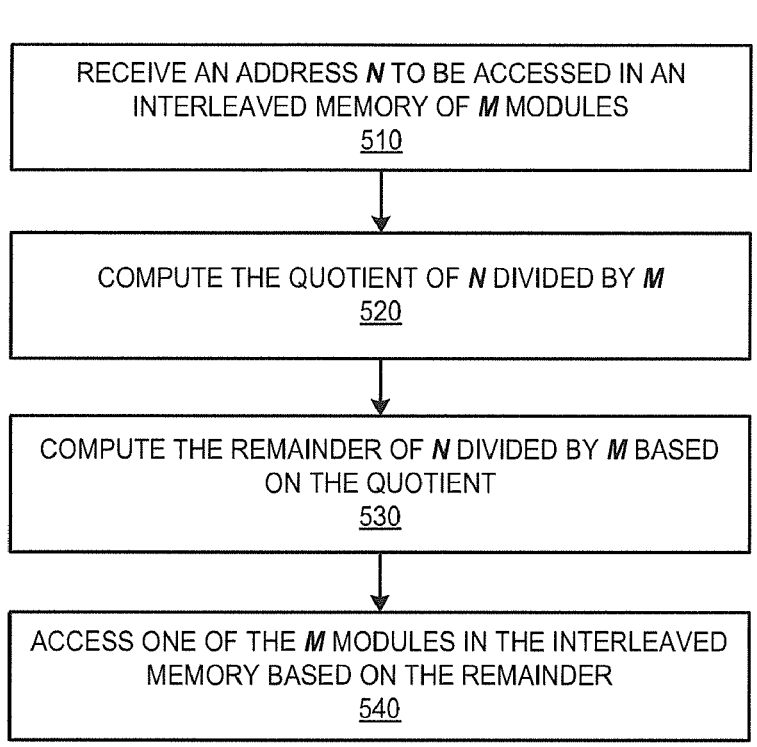
FIG. 5 is a flow diagram illustrating operations to be performed according to one embodiment.

FIG. 5 is a flow diagram of a method 500 for accessing an interleaved memory system according to one embodiment of the invention. In various embodiments, the method 500 may be performed by a general-purpose processor, a special-purpose processor (e.g., a graphics processor or a digital signal processor), or another type of digital logic device or instruction processing apparatus. In some embodiments, the method 500 may be performed by the instruction processing apparatus 415 of FIG. 4A, or a similar processor, apparatus, or system, such as the embodiments shown in FIGS. 7-13. Moreover, the instruction processing apparatus 415 of FIG. 4A, as well as the processor, apparatus, or system shown in FIGS. 7-13 may perform embodiments of operations and methods either the same as, similar to, or different than those of the method 500 of FIG. 5.

The method 500 begins with hardware (e.g., the memory controller 450 or the cache controller 460 of FIG. 4A) during runtime receives an address N to be accessed in memory (e.g., main memory or cache memory) of M modules, wherein M is $(2^n + 1)$ or $(2^n + 1)$ and n is an integer number (block 510). The hardware computes the quotient of N divided by M by performing shift and add/subtract operations based on the binomial series expansion of N over M (block 520). In some embodiments, the hardware left-shifts N by k bits before the shift and add/subtract operations of the binomial series expansion and right-shifts N by k bits after the shift and add/subtract operations (according to Equation 6), where k is a pre-computed number. Based on the quotient, the hardware computes the remainder of N divided by M (block 530). In some embodiments, the hardware calculates a first remainder using the quotient, and a second remainder using the quotient incremented by one, and selects one of the two remainders that is non-negative and less than M as the final remainder. The hardware then accesses one of the M modules in the memory based on the remainder (block 540); more specifically, the hardware accesses the module that is indexed or pointed to by the final remainder.

For the set-associative cache, the hardware (e.g., the cache controller) can search the slots in the set identified by the final remainder to locate a stored data element or to store a data element. For the main memory, the hardware (e.g., the memory controller) also uses the quotient (or more specifically, a final quotient) as an offset to access a location within the identified memory module. The final remainder, which is either the quotient or the quotient incremented by one, is determined or selected based on whichever remainder (the first or the second remainder) is selected.

In some embodiments, the instructions received by the instruction processing apparatus 415 of FIG. 4A may be converted by a binary translator, which converts an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 6:
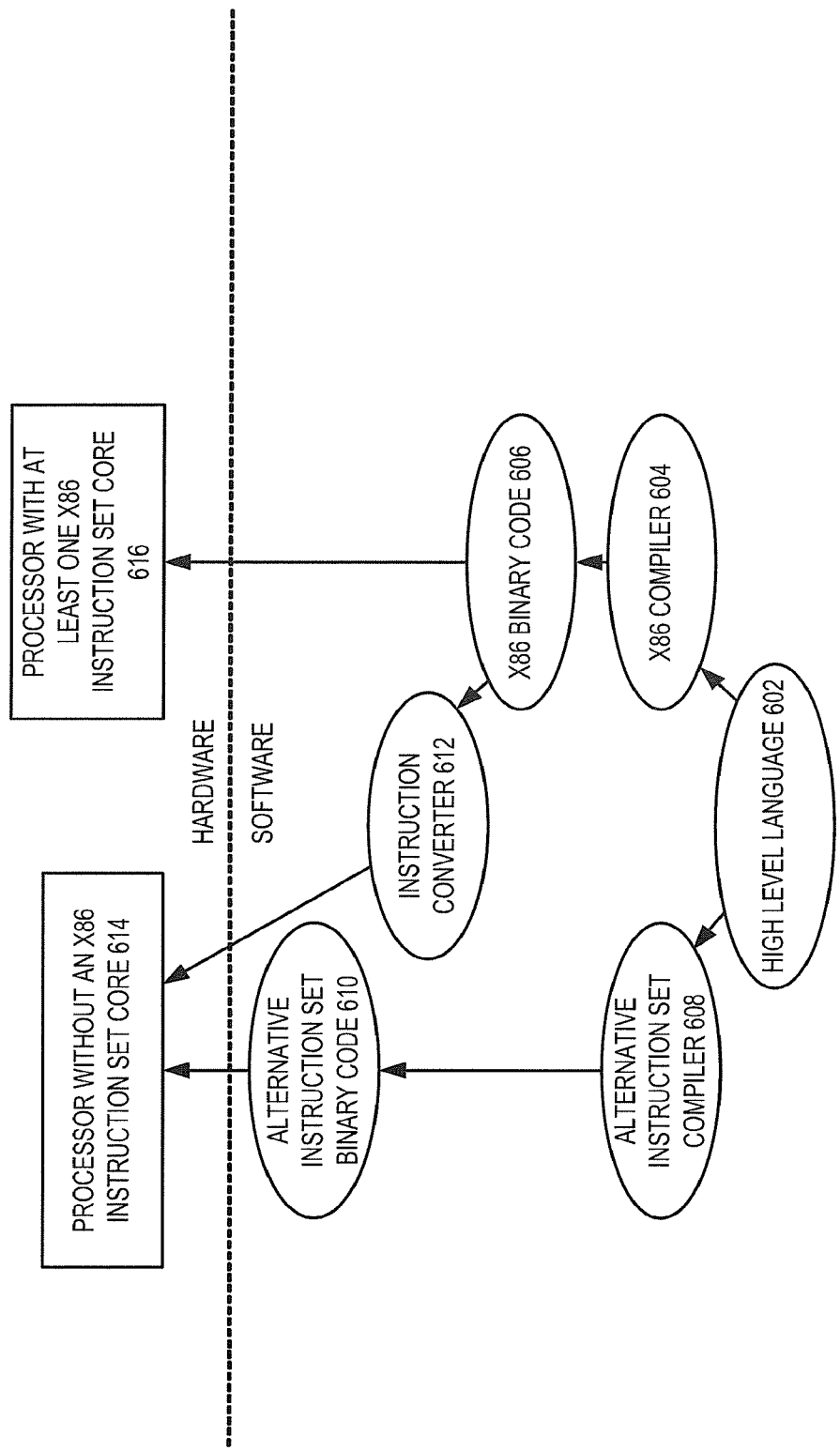
FIG. 6 is a block diagram illustrating the use of a software instruction converter to convert binary instructions in a source instruction set to binary instructions in a target instruction set according to one embodiment.

FIG. 6 is a block diagram contrasting the use of a software instruction converter according to embodiments of the invention. In the illustrated embodiment, the instruction converter is a software instruction converter, although alternatively the instruction converter may be implemented in software, firmware, hardware, or various combinations thereof. FIG. 6 shows a program in a high level language 602 may be compiled using an x86 compiler 604 to generate x86 binary code 606 that may be natively executed by a processor with at least one x86 instruction set core 616. The processor with at least one x86 instruction set core 616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 604 represents a compiler that is operable to generate x86 binary code 606 (e.g., object code) that can, with or without additional linkage processing, be executed on the processor with at least one x86 instruction set core 616. Similarly, FIG. 6 shows the program in the high level language 602 may be compiled using an alternative instruction set compiler 608 to generate alternative instruction set binary code 610 that may be natively executed by a processor without at least one x86 instruction set core 614 (e.g., a processor with cores that execute the MIPS instruction set of MIPS Technologies of Sunnyvale, Calif. and/or that execute the ARM instruction set of ARM Holdings of Sunnyvale, Calif.). The instruction converter 612 is used to convert the x86 binary code 606 into code that may be natively executed by the processor without an x86 instruction set core 614. This converted code is not likely to be the same as the alternative instruction set binary code 610 because an instruction converter capable of this is difficult to make; however, the converted code will accomplish the general operation and be made up of instructions from the alternative instruction set. Thus, the instruction converter 612 represents software, firmware, hardware, or a combination thereof that, through emulation, simulation or any other process, allows a processor or other electronic device that does not have an x86 instruction set processor or core to execute the x86 binary code 606.

Exemplary Core Architectures
In-Order and Out-of-Order Core Block Diagram
FIG. 7A is a block diagram illustrating both an exemplary in-order pipeline and an exemplary register renaming, out-of-order issue/execution pipeline according to embodiments of the invention. FIG. 7B is a block diagram illustrating both an exemplary embodiment of an in-order architecture core and an exemplary register renaming, out-of-order issue/execution architecture core to be included in a processor according to embodiments of the invention. The solid lined boxes in FIGS. 7A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 7A, a processor pipeline 700 includes a fetch stage 702, a length decode stage 704, a decode stage 706, an allocation stage 708, a renaming stage 710, a scheduling (also known as a dispatch or issue) stage 712, a register read/memory read stage 714, an execute stage 716, a write back/memory write stage 718, an exception handling stage 722, and a commit stage 724.

FIG. 7B shows processor core 790 including a front end unit 730 coupled to an execution engine unit 750, and both are coupled to a memory unit 770. The core 790 may be a reduced instruction set computing (RISC) core, a complex instruction set computing (CISC) core, a very long instruction word (VLIW) core, or a hybrid or alternative core type. As yet another option, the core 790 may be a special-purpose core, such as, for example, a network or communication core, compression engine, coprocessor core, general purpose computing graphics processing unit (GPGPU) core, graphics core, or the like.

The front end unit 730 includes a branch prediction unit 732 coupled to an instruction cache unit 734, which is coupled to an instruction translation lookaside buffer (TLB) 736, which is coupled to an instruction fetch unit 738, which is coupled to a decode unit 740. The decode unit 740 (or decoder) may decode instructions, and generate as an output one or more micro-operations, micro-code entry points, microinstructions, other instructions, or other control signals, which are decoded from, or which otherwise reflect, or are derived from, the original instructions. The decode unit 740 may be implemented using various different mechanisms. Examples of suitable mechanisms include, but are not limited to, look-up tables, hardware implementations, programmable logic arrays (PLAs), microcode read only memories (ROMs), etc. In one embodiment, the core 790 includes a microcode ROM or other medium that stores microcode for certain macroinstructions (e.g., in decode unit 740 or otherwise within the front end unit 730). The decode unit 740 is coupled to a rename/allocator unit 752 in the execution engine unit 750.

The execution engine unit 750 includes the rename/allocator unit 752 coupled to a retirement unit 754 and a set of one or more scheduler unit(s) 756. The scheduler unit(s) 756 represents any number of different schedulers, including reservations stations, central instruction window, etc. The scheduler unit(s) 756 is coupled to the physical register file(s) unit(s) 758. Each of the physical register file(s) units 758 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 758 comprises a vector registers unit, a write mask registers unit, and a scalar registers unit. These register units may provide architectural vector registers, vector mask registers, and general purpose registers. The physical register file(s) unit(s) 758 is overlapped by the retirement unit 754 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 754 and the physical register file(s) unit(s) 758 are coupled to the execution cluster(s) 760. The execution cluster(s) 760 includes a set of one or more execution units 762 and a set of one or more memory access units 764. The execution units 762 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 756, physical register file(s) unit(s) 758, and execution cluster(s) 760 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 764). It should also be understood that where separate pipelines are used, one or more of these pipelines may be out-of-order issue/execution and the rest in-order.

The set of memory access units 764 is coupled to the memory unit 770, which includes a data TLB unit 772 coupled to a data cache unit 774 coupled to a level 2 (L2) cache unit 776. In one exemplary embodiment, the memory access units 764 may include a load unit, a store address unit, and a store data unit, each of which is coupled to the data TLB unit 772 in the memory unit 770. The instruction cache unit 734 is further coupled to a level 2 (L2) cache unit 776 in the memory unit 770. The L2 cache unit 776 is coupled to one or more other levels of cache and eventually to a main memory.

By way of example, the exemplary register renaming, out-of-order issue/execution core architecture may implement the pipeline 700 as follows: 1) the instruction fetch 738 performs the fetch and length decoding stages 702 and 704; 2) the decode unit 740 performs the decode stage 706; 3) the rename/allocator unit 752 performs the allocation stage 708 and renaming stage 710; 4) the scheduler unit(s) 756 performs the schedule stage 712; 5) the physical register file(s) unit(s) 758 and the memory unit 770 perform the register read/memory read stage 714; the execution cluster 760 perform the execute stage 716; 6) the memory unit 770 and the physical register file(s) unit(s) 758 perform the write back/memory write stage 718; 7) various units may be involved in the exception handling stage 722; and 8) the retirement unit 754 and the physical register file(s) unit(s) 758 perform the commit stage 724.

The core 790 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 790 includes logic to support a packed data instruction set extension (e.g., SSE, AVX1, AVX2, etc.), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 734/774 and a shared L2 cache unit 776, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Cure Architecture

Figure 8B:
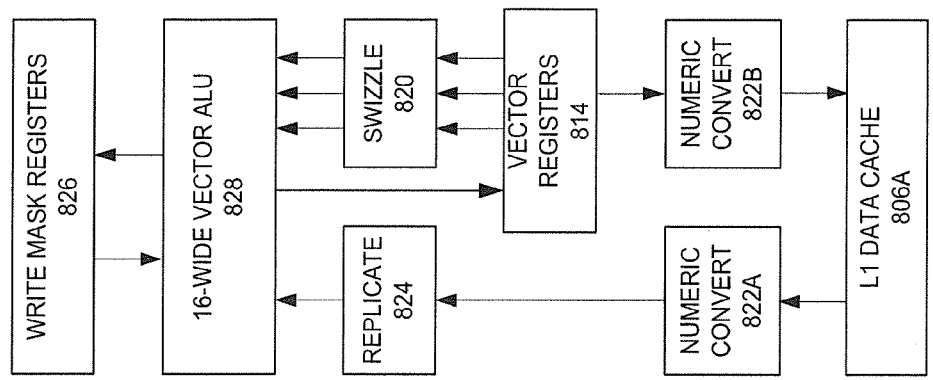
FIGS. 8A-B are block diagrams of a more specific exemplary in-order core architecture according to one embodiment.
Figure 8A:
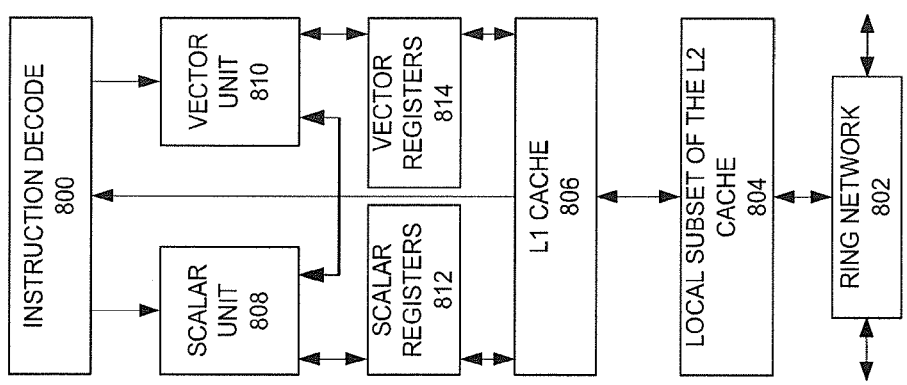

FIGS. 8A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 8A is a block diagram of a single processor core, along with its connection to the on-die interconnect network 802 and with its local subset of the Level 2 (L2) cache 804, according to embodiments of the invention. In one embodiment, an instruction decoder 800 supports the x86 instruction set with a packed data instruction set extension. An L1 cache 806 allows low-latency accesses to cache memory into the scalar and vector units. While in one embodiment (to simplify the design), a scalar unit 808 and a vector unit 810 use separate register sets (respectively, scalar registers 812 and vector registers 814) and data transferred between them is written to memory and then read back in from a level 1 (L1) cache 806, alternative embodiments of the invention may use a different approach (e.g., use a single register set or include a communication path that allow data to be transferred between the two register files without being written and read back).

The local subset of the L2 cache 804 is part of a global L2 cache that is divided into separate local subsets, one per processor core. Each processor core has a direct access path to its own local subset of the L2 cache 804. Data read by a processor core is stored in its L2 cache subset 804 and can be accessed quickly, in parallel with other processor cores accessing their own local L2 cache subsets. Data written by a processor core is stored in its own L2 cache subset 804 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 8B is an expanded view of part of the processor core in FIG. 8A according to embodiments of the invention. FIG. 8B includes an L1 data cache 806A part of the L1 cache 804, as well as more detail regarding the vector unit 810 and the vector registers 814. Specifically, the vector unit 810 is a 16-wide vector processing unit (VPU) (see the 16-wide ALU 828), which executes one or more of integer, single-precision float, and double-precision float instructions. The VPU supports swizzling the register inputs with swizzle unit 820, numeric conversion with numeric convert units 822A-B, and replication with replication unit 824 on the memory input. Write mask registers 826 allow predicating resulting vector writes.

Processor with Integrated Memory Controller and Graphics

Figure 9:
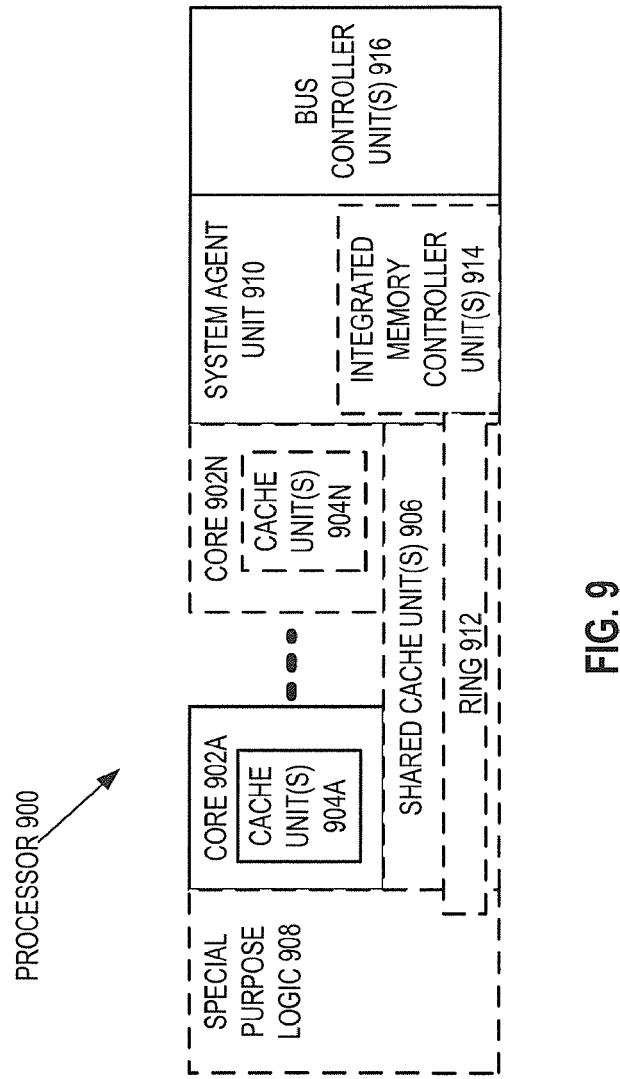
FIG. 9 is a block diagram of a processor according to one embodiment.

FIG. 9 is a block diagram of a processor 900 that may have more than one core, may have an integrated memory controller, and may have integrated graphics according to embodiments of the invention. The solid lined boxes in FIG. 9 illustrate a processor 900 with a single core 902A, a system agent 910, a set of one or more bus controller units 916, while the optional addition of the dashed lined boxes illustrates an alternative processor 900 with multiple cores 902A-N, a set of one or more integrated memory controller unit(s) 914 in the system agent unit 910, and special purpose logic 908.

Thus, different implementations of the processor 900 may include: 1) a CPU with the special purpose logic 908 being integrated graphics and/or scientific (throughput) logic (which may include one or more cores), and the cores 902A-N being one or more general purpose cores (e.g., general purpose in-order cores, general purpose out-of-order cores, a combination of the two); 2) a coprocessor with the cores 902A-N being a large number of special purpose cores intended primarily for graphics and/or scientific (throughput); and 3) a coprocessor with the cores 902A-N being a large number of general purpose in-order cores. Thus, the processor 900 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 900 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 906, and external memory (not shown) coupled to the set of integrated memory controller units 914. The set of shared cache units 906 may include one or more mid-level caches, such as level 2 (L2), level 3 (L3), level 4 (L4), or other levels of cache, a last level cache (LLC), and/or combinations thereof. While in one embodiment a ring based interconnect unit 912 interconnects the integrated graphics logic 908, the set of shared cache units 906, and the system agent unit 910/integrated memory controller unit(s) 914, alternative embodiments may use any number of well-known techniques for interconnecting such units. In one embodiment, coherency is maintained between one or more cache units 906 and cores 902-A-N.

In some embodiments, one or more of the cores 902A-N are capable of multi-threading. The system agent 910 includes those components coordinating and operating cores 902A-N. The system agent unit 910 may include for example a power control unit (PCU) and a display unit. The PCU may be or include logic and components needed for regulating the power state of the cores 902A-N and the integrated graphics logic 908. The display unit is for driving one or more externally connected displays.

The cores 902A-N may be homogenous or heterogeneous in terms of architecture instruction set; that is, two or more of the cores 902A-N may be capable of execution the same instruction set, while others may be capable of executing only a subset of that instruction set or a different instruction set.

Exemplary Computer Architectures

FIGS. 10-13 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 10:
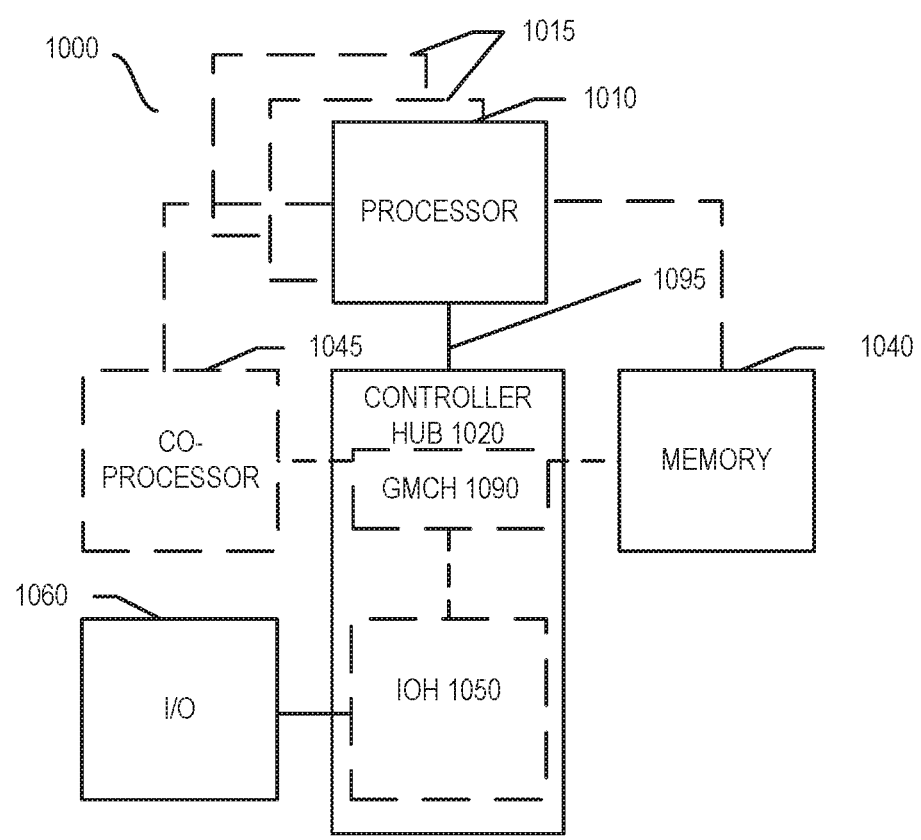
FIG. 10 is a block diagram of a system in accordance with one embodiment.

Referring now to FIG. 10, shown is a block diagram of a system 1000 in accordance with one embodiment of the present invention. The system 1000 may include one or more processors 1010, 1015, which are coupled to a controller hub 1020. In one embodiment the controller hub 1020 includes a graphics memory controller hub (GMCH) 1090 and an Input/Output Hub (IOH) 1050 (which may be on separate chips); the GMCH 1090 includes memory and graphics controllers to which are coupled memory 1040 and a coprocessor 1045; the IOH 1050 is couples input/output (I/O) devices 1060 to the GMCH 1090. Alternatively, one or both of the memory and graphics controllers are integrated within the processor (as described herein), the memory 1040 and the coprocessor 1045 are coupled directly to the processor 1010, and the controller hub 1020 in a single chip with the IOH 1050.

The optional nature of additional processors 1015 is denoted in FIG. 10 with broken lines. Each processor 1010, 1015 may include one or more of the processing cores described herein and may be some version of the processor 900.

The memory 1040 may be, for example, dynamic random access memory (DRAM), phase change memory (PCM), or a combination of the two. For at least one embodiment, the controller hub 1020 communicates with the processor(s) 1010, 1015 via a multi-drop bus, such as a frontside bus (FSB), point-to-point interface such as QuickPath Interconnect (QPI), or similar connection 1095.

In one embodiment, the coprocessor 1045 is a special-purpose processor, such as, for example, a high-throughput MIC processor, a network or communication processor, compression engine, graphics processor, GPGPU, embedded processor, or the like. In one embodiment, controller hub 1020 may include an integrated graphics accelerator.

There can be a variety of differences between the physical resources 1010, 1015 in terms of a spectrum of metrics of merit including architectural, microarchitectural, thermal, power consumption characteristics, and the like.

In one embodiment, the processor 1010 executes instructions that control data processing operations of a general type. Embedded within the instructions may be coprocessor instructions. The processor 1010 recognizes these coprocessor instructions as being of a type that should be executed by the attached coprocessor 1045. Accordingly, the processor 1010 issues these coprocessor instructions (or control signals representing coprocessor instructions) on a coprocessor bus or other interconnect, to coprocessor 1045. Coprocessor(s) 1045 accept and execute the received coprocessor instructions.

Figure 11:
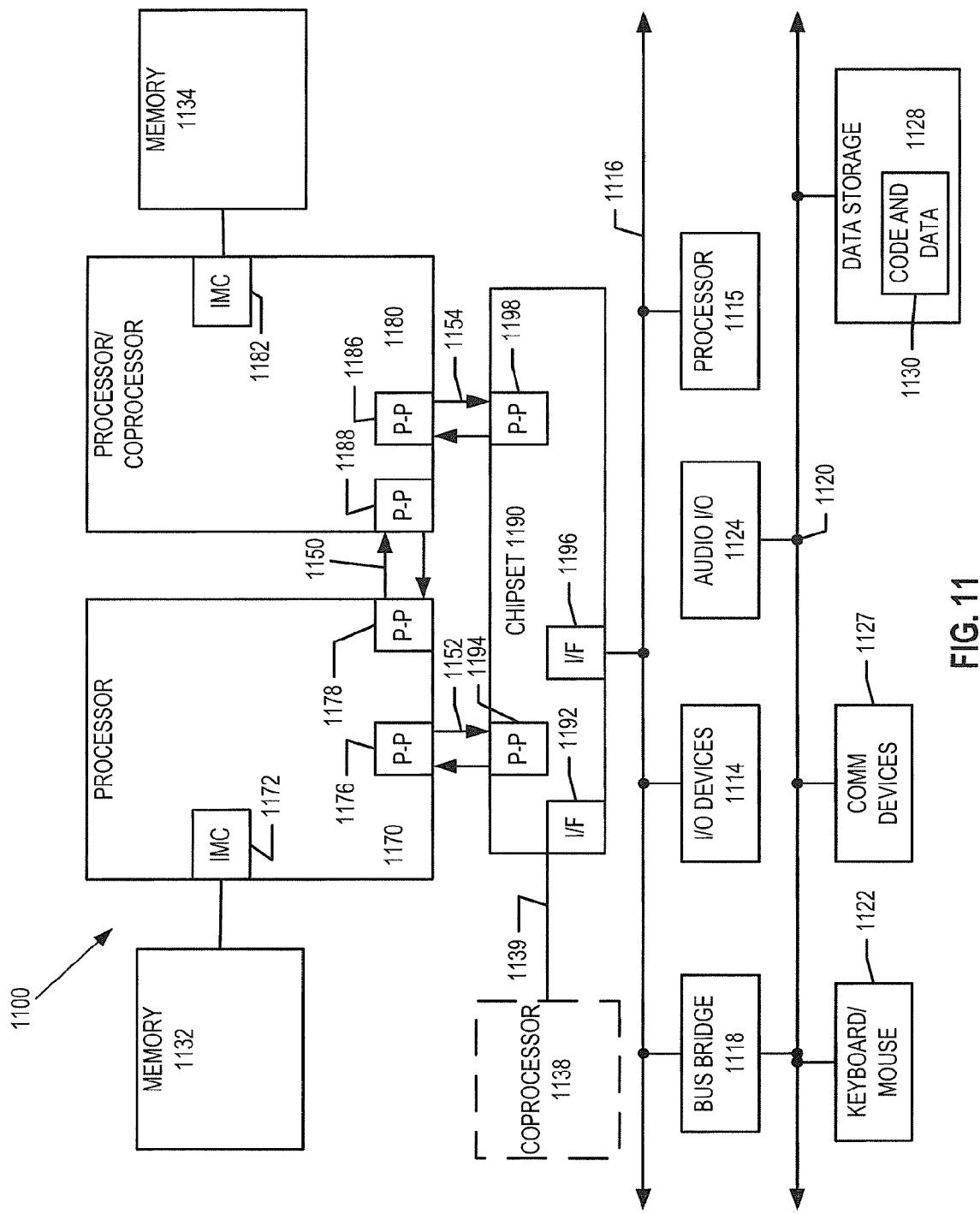
FIG. 11 is a block diagram of a second system in accordance with one embodiment.

Referring now to FIG. 11, shown is a block diagram of a first more specific exemplary system 1100 in accordance with an embodiment of the present invention. As shown in FIG. 11, multiprocessor system 1100 is a point-to-point interconnect system, and includes a first processor 1170 and a second processor 1180 coupled via a point-to-point interconnect 1150. Each of processors 1170 and 1180 may be some version of the processor 900. In one embodiment of the invention, processors 1170 and 1180 are respectively processors 1010 and 1015, while coprocessor 1138 is coprocessor 1045. In another embodiment, processors 1170 and 1180 are respectively processor 1010 coprocessor 1045.

Processors 1170 and 1180 are shown including integrated memory controller (IMC) units 1172 and 1182, respectively. Processor 1170 also includes as part of its bus controller units point-to-point (P-P) interfaces 1176 and 1178; similarly, second processor 1180 includes P-P interfaces 1186 and 1188.

Processors 1170, 1180 may exchange information via a point-to-point (P-P) interface 1150 using P-P interface circuits 1178, 1188. As shown in FIG. 11, IMCs 1172 and 1182 couple the processors to respective memories, namely a memory 1132 and a memory 1134, which may be portions of main memory locally attached to the respective processors.

Processors 1170, 1180 may each exchange information with a chipset 1190 via individual P-P interfaces 1152, 1154 using point to point interface circuits 1176, 1194, 1186, 1198. Chipset 1190 may optionally exchange information with the coprocessor 1138 via a high-performance interface 1139. In one embodiment, the coprocessor 1138 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1190 may be coupled to a first bus 1116 via an interface 1196. In one embodiment, first bus 1116 may be a Peripheral Component Interconnect (PCI) bus, or a bus such as a PCI Express bus or another third generation I/O interconnect bus, although the scope of the present invention is not so limited.

As shown in FIG. 11, various I/O devices 1114 may be coupled to first bus 1116, along with a bus bridge 1118 which couples first bus 1116 to a second bus 1120. In one embodiment, one or more additional processor(s) 1115, such as coprocessors, high-throughput MIC processors, GPGPU's, accelerators (such as, e.g., graphics accelerators or digital signal processing (DSP) units), field programmable gate arrays, or any other processor, are coupled to first bus 1116. In one embodiment, second bus 1120 may be a low pin count (LPC) bus. Various devices may be coupled to a second bus 1120 including, for example, a keyboard and/or mouse 1122, communication devices 1127 and a storage unit 1128 such as a disk drive or other mass storage device which may include instructions/code and data 1130, in one embodiment. Further, an audio I/O 1124 may be coupled to the second bus 1120. Note that other architectures are possible. For example, instead of the point-to-point architecture of FIG. 11, a system may implement a multi-drop bus or other such architecture.

Figure 12:
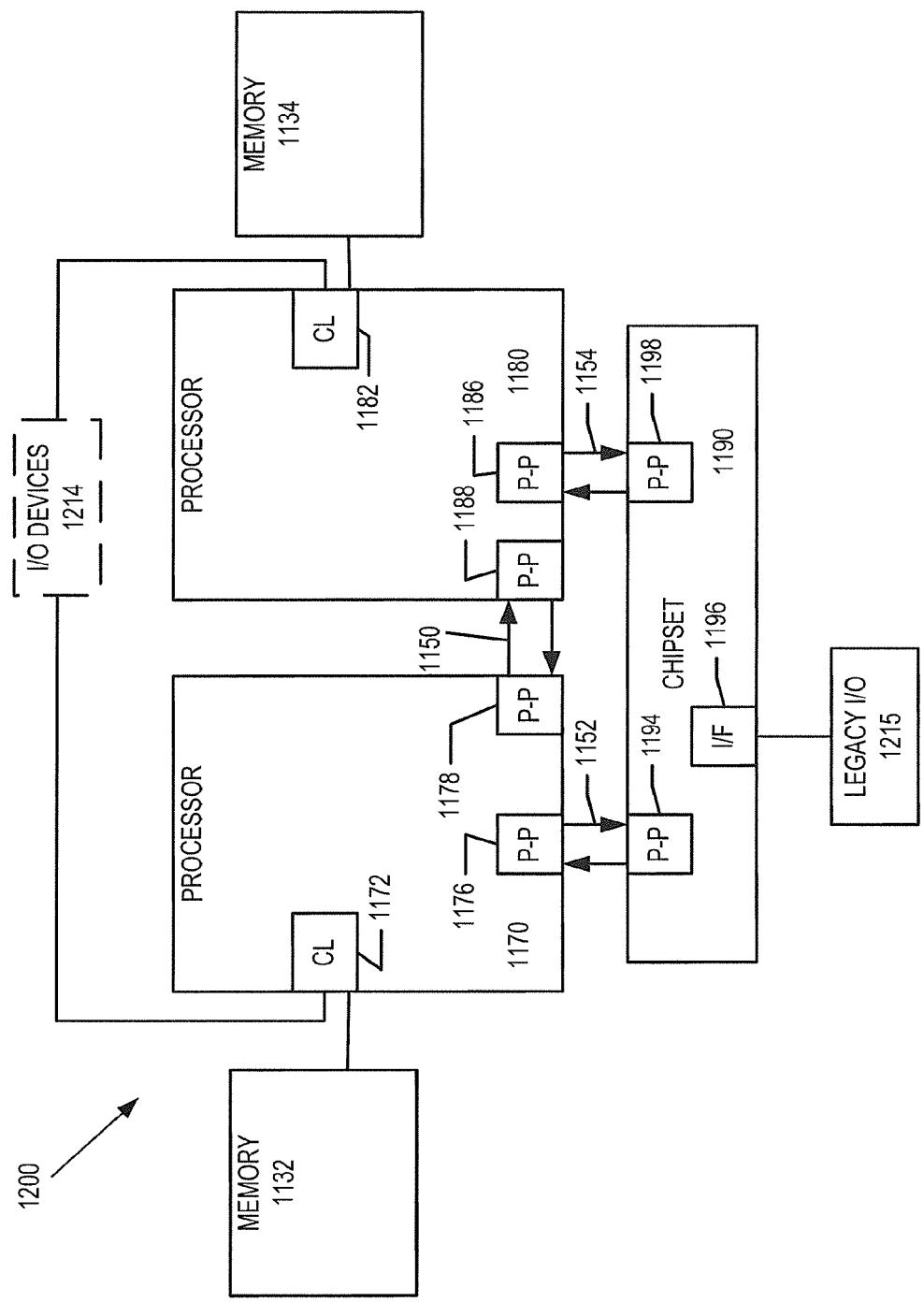
FIG. 12 is a block diagram of a third system in accordance with an embodiment of the invention.

Referring now to FIG. 12, shown is a block diagram of a second more specific exemplary system 1200 in accordance with an embodiment of the present invention. Like elements in FIGS. 11 and 12 bear like reference numerals, and certain aspects of FIG. 11 have been omitted from FIG. 12 in order to avoid obscuring other aspects of FIG. 12.

FIG. 12 illustrates that the processors 1170, 1180 may include integrated memory and I/O control logic ("CL") 1172 and 1182, respectively. Thus, the CL 1172, 1182 include integrated memory controller units and include I/O control logic. FIG. 12 illustrates that not only are the memories 1132, 1134 coupled to the CL 1172, 1182, but also that I/O devices 1214 are also coupled to the control logic 1172, 1182. Legacy I/O devices 1215 are coupled to the chipset 1190.

Figure 13:
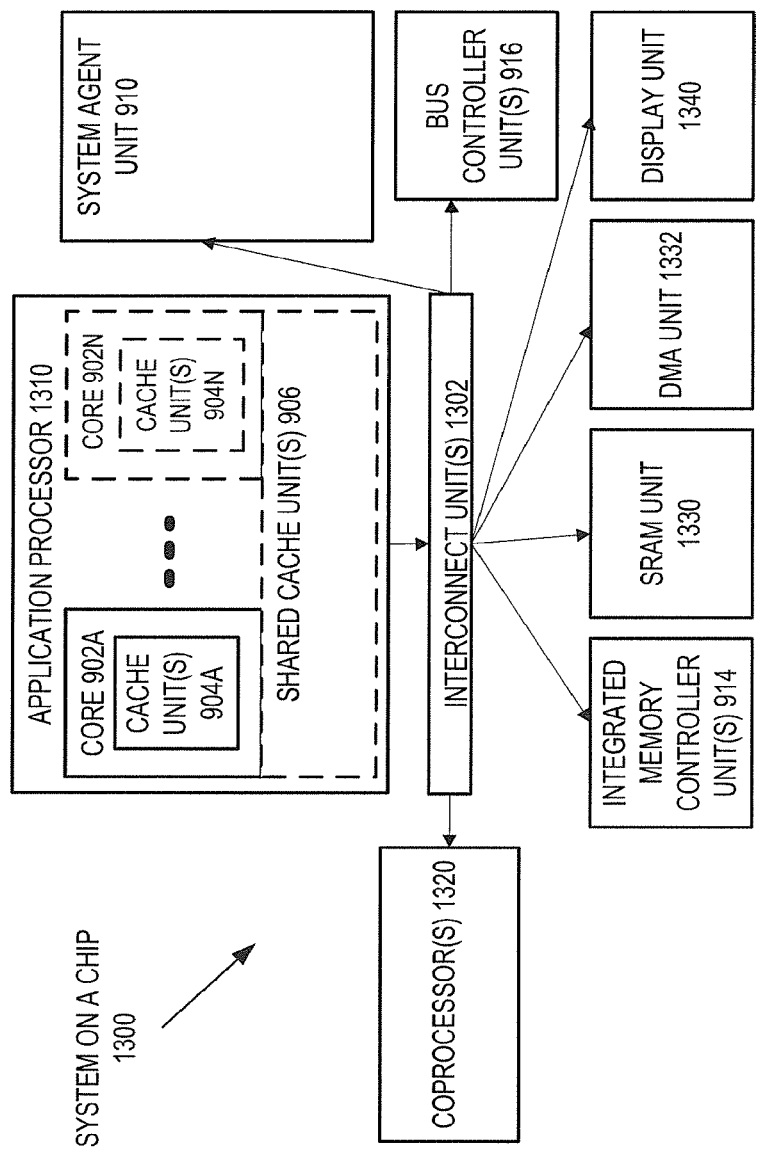
FIG. 13 is a block diagram of a system-on-a-chip (SoC) in accordance with one embodiment.

Referring now to FIG. 13, shown is a block diagram of a SoC 1300 in accordance with an embodiment of the present invention. Similar elements in FIG. 9 bear like reference numerals. Also, dashed lined boxes are optional features on more advanced SoCs. In FIG. 13, an interconnect unit(s) 1302 is coupled to: an application processor 1310 which includes a set of one or more cores 202A-N and shared cache unit(s) 906; a system agent unit 910; a bus controller unit(s) 916; an integrated memory controller unit(s) 914; a set or one or more coprocessors 1320 which may include integrated graphics logic, an image processor, an audio processor, and a video processor; an static random access memory (SRAM) unit 1330; a direct memory access (DMA) unit 1332; and a display unit 1340 for coupling to one or more external displays. In one embodiment, the coprocessor(s) 1320 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1130 illustrated in FIG. 11, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

What is claimed is:

1. An apparatus for accessing an interleaved memory of a number of modules within a computer system comprising:
    a controller to receive an address to be accessed in the interleaved memory, and to calculate one of the number of modules that stores the address in a single cycle without causing fixed locations in the interleaved memory to be unutilized, wherein the controller comprises:
        a quotient calculation unit to compute a quotient of the address divided by the number of modules, the number of modules being $(2^n+1)$, n being a positive integer number;
        a remainder calculation unit to compute a remainder of the address divided by the number of modules based on the quotient, wherein the remainder calculation unit to calculate a first remainder using the quotient and a second remainder using the quotient incremented by one, and select one of the first remainder and the second remainder, which is non-negative and less than the number of modules, as a final remainder; and
        a memory accessing unit to access one of the modules in the interleaved memory based on the remainder.

2. The apparatus of claim 1, wherein the quotient is calculated based on a binomial series expansion of the address over the number of modules.

3. The apparatus of claim 1, wherein the quotient calculation unit, based on a result of selecting the final remainder, selects the quotient or the quotient incremented by one as a final quotient for identifying an offset within the one of the modules.

4. The apparatus of claim 1, wherein the interleaved memory is a set-associative cache memory, and the final remainder to serve as a set index.

5. The apparatus of claim 1, wherein the interleaved memory is a main memory accessible by a general or special purpose processor.

6. The apparatus of claim 1, wherein the quotient calculation unit to left-shift the address by a number of bits before the shift and add/subtract operations of binomial series expansion, and right-shift the address by the number of bits after the shift and add/subtract operations of binomial series expansion.

7. A method for accessing an interleaved memory of a number of modules within a computer system comprising:
    receiving an address to be accessed in the interleaved memory;
    computing a quotient and a remainder of the address divided by the number of modules in a single cycle without causing fixed locations in the interleaved memory to be unutilized, the number of modules being $(2^n+1)$, n being a positive integer number, wherein computing the remainder comprises
        calculating a first remainder using the quotient,
        calculating a second remainder using the quotient incremented by one, and
        selecting one of the first remainder and the second remainder, which is non-negative and less than the number of modules, as a final remainder; and
    accessing one of the modules in the interleaved memory based on the remainder.

8. The method of claim 7, wherein the quotient is calculated based on a binomial series expansion of the address over the number of modules.

9. The method of claim 7, further comprising:
    selecting, based on a result of selecting the final remainder, the quotient or the quotient incremented by one as a final quotient for identifying an offset within the one of the modules.

10. The method of claim 7, wherein the memory is a set-associative cache memory, and the final remainder serves as a set index.

11. The method of claim 7, wherein the memory is a main memory accessible by a general or special purpose processor.

12. The method of claim 7, wherein performing the shift and add/subtract operations further comprises:
    left-shifting the address by a number of bits before the shift and add/subtract operations of binomial series expansion; and
    right-shifting the address by the number of bits after the shift and add/subtract operations.

13. An apparatus for accessing an interleaved memory of a number of modules within a computer system comprising:
    a controller to receive an address to be accessed in the memory, wherein the controller comprises:
        a quotient calculation unit to compute a quotient of the address divided by the number of modules in a single cycle without causing fixed locations in the interleaved memory to be unutilized, the number of modules being $(2^n+1)$ or $(2^n-1)$, n being a positive integer number;
        a remainder calculation unit to compute a remainder of the address divided by the number of modules based on the quotient, wherein the remainder calculation means calculates a first remainder using the quotient and a second remainder using the quotient incremented by one, and selects one of the first remainder and the second remainder, which is non-negative and less than the number of modules, as a final remainder; and
        a memory accessing unit to access one of the modules in the interleaved memory based on the remainder.

14. The apparatus of claim 13, wherein the quotient is calculated based on a binomial series expansion of the address over the number of modules.

15. The apparatus of claim 13, wherein the quotient calculation unit, based on a result of selecting the final remainder, to select the quotient or the quotient incremented by one as a final quotient for identifying an offset within the one of the modules.

16. The apparatus of claim 13, wherein the memory is a set-associative cache memory, and the final remainder to serve as a set index.

17. The apparatus of claim 13, wherein the memory is a main memory accessible by a general or special purpose processor.

18. The apparatus of claim 13, wherein the quotient calculation unit to left-shift the address by a number of bits before the shift and add/subtract operations of binomial series expansion, and right-shift the address by the number of bits after the shift and add/subtract operations of binomial series expansion.

19. A system for accessing an interleaved memory of M modules within a computer system comprising:
- the interleaved memory including the M modules, M being $(2^n+1)$ or $(2^n-1)$, n being a positive integer number;
- a processor coupled to the memory; and
- a controller coupled to the processor to receive an address N to be accessed in the memory, the controller comprises:
  - a quotient calculation unit to compute a quotient of the address divided by the number of modules, the number of modules being $(2^n+1)$ or $(2^n-1)$, n being a positive integer number;
  - a remainder calculation unit to compute a remainder of the address divided by the number of modules based on the quotient, wherein the remainder calculation unit calculates a first remainder using the quotient and a second remainder using the quotient incremented by one, and selects one of the first remainder and the second remainder, which is non-negative and less than M, as a final remainder; and
  - a memory accessing unit to access one of the modules in the interleaved memory based on the remainder.

20. The system of claim 19, wherein the quotient is calculated based on a binomial series expansion of the address over the number of modules.

21. The system of claim 19, wherein the quotient calculation unit, based on a result of selecting the final remainder, selects the quotient or the quotient incremented by one as a final quotient for identifying an offset within the one of the number of modules.

22. The system of claim 19, wherein the memory is a set-associative cache memory, and the final remainder to serve as a set index.

23. The system of claim 19, wherein the memory is a main memory accessible by a general or special purpose processor.

24. The system of claim 19, wherein the quotient calculation unit to left-shift the address by a number of bits before the shift and add/subtract operations of binomial series expansion, and right-shift the address by the number of bits after the shift and add/subtract operations of binomial series expansion.

* * * * *